US008615276B2

(12) United States Patent
Tanaka et al.

(10) Patent No.: US 8,615,276 B2
(45) Date of Patent: Dec. 24, 2013

(54) METHOD FOR CONTROLLING STANDBY OPERATIONS COMPATIBLE WITH A PLURALITY OF WIRELESS COMMUNICATION SYSTEMS AND METHOD FOR PERFORMING OPERATIONS COMPATIBLE WITH A PLURALITY OF WIRELESS COMMUNICATION SYSTEMS

(75) Inventors: Yuya Tanaka, Gifu (JP); Toma Watanabe, Gifu (JP); Nirou Imaoka, Hashima (JP); Akifumi Hirata, Gifu (JP); Yasuhiro Tanaka, Aichi (JP)

(73) Assignee: Kyocera Corporation, Kyoto (JP)

( * ) Notice: Subject to any disclaimer, the term of this patent is extended or adjusted under 35 U.S.C. 154(b) by 1648 days.

(21) Appl. No.: 11/890,483

(22) Filed: Aug. 7, 2007

(65) Prior Publication Data
US 2008/0058000 A1 Mar. 6, 2008

(30) Foreign Application Priority Data

Aug. 31, 2006 (JP) .................................. 2006-236822
Aug. 31, 2006 (JP) .................................. 2006-236823

(51) Int. Cl.
*H04M 1/00* (2006.01)

(52) U.S. Cl.
USPC ...... 455/574; 370/311; 455/552.1; 455/343.5

(58) Field of Classification Search
USPC ............. 455/550.1, 552.1, 574, 343.1–343.5; 370/318, 338, 311
See application file for complete search history.

(56) References Cited

U.S. PATENT DOCUMENTS

| 7,146,151 | B2 * | 12/2006 | Arimitsu | 455/343.2 |
| 7,362,720 | B2 * | 4/2008 | Kakumaru et al. | 370/328 |
| 8,452,350 | B2 * | 5/2013 | Chishima et al. | 455/572 |
| 2004/0100923 | A1 * | 5/2004 | Yam | 370/328 |
| 2006/0050773 | A1 * | 3/2006 | Yano | 375/148 |
| 2006/0262739 | A1 * | 11/2006 | Ramirez et al. | 370/311 |
| 2007/0129045 | A1 * | 6/2007 | Aerrabotu | 455/343.5 |
| 2008/0009328 | A1 * | 1/2008 | Narasimha | 455/574 |

FOREIGN PATENT DOCUMENTS

| JP | 10-209953 | 8/1998 |
| JP | 2000-341734 | 12/2000 |
| JP | 2002-010351 | 1/2002 |

(Continued)

OTHER PUBLICATIONS

Decision of Refusal (English translation) for JP 2006-236822, mailed Oct. 18, 2011, 3 pages.

(Continued)

*Primary Examiner* — German J Vianna Di Prisco
(74) *Attorney, Agent, or Firm* — Duane Morris LLP

(57) ABSTRACT

A radio unit and a baseband processing unit perform wireless communications with a plurality of base station apparatuses compatible with a plurality of wireless communication schemes, respectively. A battery remaining amount management unit inspects a remaining amount of battery to be supplied to the radio unit and the like. A control unit controls standby operations that the radio unit and the baseband processing unit are to perform on the plurality of wireless communication schemes, based on the remaining amount of battery inspected by the battery remaining amount management unit. The control unit defines degrees of priority for the plurality of wireless communication schemes, respectively. As the remaining amount of battery becomes low, the control unit sets long a time interval of the standby operation for a base station compatible with a wireless communication scheme having a low degree of priority.

4 Claims, 14 Drawing Sheets

(56) References Cited

FOREIGN PATENT DOCUMENTS

| | | |
|---|---|---|
| JP | 2002-077010 | 3/2002 |
| JP | 2002-101029 | 4/2002 |
| JP | 2002-101460 | 4/2002 |
| JP | 2002-112347 | 4/2002 |
| JP | 2002-125265 | 4/2002 |
| JP | 2003-169011 | 6/2003 |
| JP | 2003-169379 | 6/2003 |
| JP | 2004-289756 | 10/2004 |
| JP | 2004-320473 | 11/2004 |
| JP | 2005-080197 | 3/2005 |
| JP | 2006-005772 | 1/2006 |
| JP | 2006-060818 | 3/2006 |
| JP | 2006-180174 | 7/2006 |

OTHER PUBLICATIONS

Office Action issued Feb. 5, 2013 in corresponding Japanese Patent Application No. 2006-236822.
Notification of Reason(s) for Refusal (translation) for JP 2006-236822, mailed Jun. 21, 2011, 3 pages.
Notification of Reason(s) for Refusal (translation) for JP 2006-236823, mailed Jun. 21, 2011, 3 pages.
JP 2006-236822 JP Office Action dated Sep. 25, 2012.

* cited by examiner

METHOD FOR CONTROLLING STANDBY OPERATIONS COMPATIBLE WITH A PLURALITY OF WIRELESS COMMUNICATION SYSTEMS AND METHOD FOR PERFORMING OPERATIONS COMPATIBLE WITH A PLURALITY OF WIRELESS COMMUNICATION SYSTEMS

CROSS-REFERENCE TO RELATED APPLICATIONS

This application is based upon and claims the benefit of priority from the prior Japanese Patent Application No. 2006-236822, filed Aug. 31, 2006 and Japanese Patent Application No. 2006-236823, filed Aug. 31, 2006, the entire contents of which are incorporated herein by reference.

BACKGROUND OF THE INVENTION

1. Field of the Invention

The present invention relates to a control technology and a communication technology for standby operations, and it particularly relates to a method for controlling standby operations compatible with a plurality of wireless communication systems and a method for performing operations compatible with a plurality of wireless communication systems.

2. Description of the Related Art

In the exemplary embodiment of the present invention, while performing communications, the radio unit 20 and the baseband processing unit 22 are executing an operation compatible with any one of a plurality of wireless communication systems. However, this should not be considered as limiting and, for example, the radio unit 20 and the baseband processing unit 22 may parallely execute operations compatible with a plurality of wireless communications systems. According to this modification, the transmission rate can be raised.

While the preferred embodiments of the present invention have been described using specific terms, such description is for illustrative purposes only, and it is to be understood that changes and variations may be made without departing from the spirit or scope of the appended claims.

In a wireless communication system, terminal apparatuses and base station apparatuses are accessed and connected to each other and communications are performed therebetween. For a plurality of wireless communication systems, there are provided terminal apparatuses and base station apparatuses compatible with the wireless communication systems, respectively. The coverage of a service area, the data rate and the characteristics such as processing delay time differ for each of a plurality of wireless communication systems. Comparing one wireless communication system with another in a plurality of wireless communication systems, each has drawbacks and advantages. In order to offset mutual drawbacks, it is effective to provide a terminal apparatus compatible with a plurality of wireless communication systems.

When one terminal apparatus is compatible with a plurality of wireless communication schemes, a standby operation for each of a plurality of wireless communication schemes is required in order for the standby operation to be compatible with any of incoming signals in the plurality of wireless communication schemes. That is, it is desired that a plurality of kinds of standby operations be executed in parallel. However, such operations do not necessarily prove desirable if the characteristics of a terminal apparatus are taken into consideration. For example, since a terminal apparatus is carrying out a battery operation, the smaller power consumption is desired. The coverage of the service area differs for each of a plurality of wireless communication schemes. At a predetermined location, some wireless communication schemes are contained in the service area whereas some are not contained in the service area. For the latter case, the standby operation is a wasteful processing. In particular a timeout and the like occur in the latter case, so that the processing becomes complicated.

SUMMARY OF THE INVENTION

The present invention has been made in view of the foregoing circumstances and a general purpose thereof is to provide a technology for controlling standby operations to achieve a standby operation according to characteristics of a terminal apparatus and a communication technology for achieving a standby operation according the characteristics of the terminal apparatus.

In order to resolve the above problems, a terminal apparatus according to one embodiment of the present invention comprises: a communication unit which performs wireless communications compatible with a plurality of wireless communication schemes, respectively; an inspection unit which inspects a remaining amount of battery to be supplied to the communication unit; and a control unit which controls a standby operation that the communication unit is to perform on the plurality of wireless communication schemes, based on the remaining amount of battery inspected by the inspection unit. The control unit defines degrees of priority for the plurality of wireless communication schemes, respectively. As the remaining amount of battery becomes low, the control unit sets long a time interval of the standby operation in a wireless communication scheme having a low degree of priority.

"Setting a time interval of the standby operation long" includes a case where the power is set to OFF by setting the time interval to the maximum value. According to this embodiment, the time interval of the standby operation in the wireless communication scheme having a low degree of priority is set long in accordance with the remaining amount of battery. Thus, the power consumption can be reduced while a usual and normal standby operation is maintained for a wireless communication scheme having a high degree of priority.

The control unit may have the communication unit inspect whether, in a first state where the remaining amount of battery is large, a wireless communication is feasible or not in the wireless communication scheme having a low degree of priority; and when the wireless communication is not feasible, the control unit may set long the time interval of the standby operation in the wireless communication scheme having a low degree of priority. The control unit may have the communication unit inspect whether, in a second state where the remaining amount of battery is smaller than the first state, the wireless communication is feasible or not in the wireless communication scheme having a low degree of priority; and when the wireless communication is not feasible, the control unit may stop the standby operation in the wireless communication scheme having a low degree of priority. In a third state where the remaining amount of battery is smaller than the second state, the control unit may stop the standby operation in the wireless communication scheme having a low degree of priority, regardless of whether the wireless communication in the wireless communication scheme having a low degree of priority is feasible or not.

"When the wireless communication is not feasible" includes a case where not only a connection cannot be established but also the wireless quality deteriorates. In such a case, as the remaining amount of battery is getting lower, the load for a wireless communication scheme having a high degree of priority is reduced in a stepwise manner, so that the power consumption can be reduced in a stepwise manner.

Another embodiment of the present invention relates also to a terminal apparatus. This apparatus comprises: a communication unit which performs wireless communications compatible with a plurality of wireless communication schemes, respectively; an inspection unit which inspects a remaining amount of battery to be supplied to the communication unit; and a reception unit which receives an instruction on a standby operation that the communication unit is to perform on the plurality of wireless communication schemes; and a control unit which controls the standby operation in the communication unit, based on the remaining amount of battery inspected by the inspection unit and the instruction received by the reception unit. When the remaining amount of battery is large, the control unit performs a standby operation according to the instruction. When the remaining amount of battery is small, the control unit performs a predetermined standby operation regardless of contents of the instruction.

By employing this embodiment, whether the instruction is to be accepted or not is switched according to the remaining amount of battery. Thus the power consumption can be reduced while the processing according to the user's instruction is accomplished.

The communication unit is provided with a plurality of antennas. As the remaining amount of battery becomes low, the control unit reduces the number of antennas to be used for the standby operation, among the plurality of antennas provided in the communication unit. In this case, the number of antennas is adjusted according to the remaining amount of battery. Therefore, the balance between the improvement in wireless quality and the reduction in power consumption can be maintained.

The terminal apparatus may further comprise a notification unit which conveys contents of the standby operation controlled by the control unit to a user. In this case, the state of an operation can be conveyed to the user.

Still another embodiment of the present invention relates to a method for controlling standby operations. This method is a method for controlling a standby operation, to be performed on a plurality of wireless communication schemes, by a terminal apparatus that performs wireless communications compatible with the plurality of wireless communication schemes, respectively, and the method is such that degrees of priority are defined for the plurality of wireless communication schemes, respectively, and as a remaining amount of battery becomes low after a remaining amount of battery to be supplied to the terminal has been inspected, a time interval of the standby operation in a wireless communication scheme having a low degree of priority is set long.

In a first state where the remaining amount of battery is large, whether a wireless communication is feasible or not in the wireless communication scheme having a low degree of priority is inspected; and when the wireless communication is not feasible, the time interval of the standby operation in the wireless communication scheme having a low degree of priority may be set long. In a second state where the remaining amount of battery is smaller than the first state, whether the wireless communication is feasible or not in the wireless communication scheme having a low degree of priority is inspected; and when the wireless communication is not feasible, the standby operation in the wireless communication scheme having a low degree of priority may be stopped. In a third state where the remaining amount of battery is smaller than the second state, the standby operation in the wireless communication scheme having a low degree of priority may be stopped, regardless of whether the wireless communication in the wireless communication scheme having a low degree of priority is feasible or not.

Still another embodiment of the present invention relates also to a method for controlling standby operations. This is a method for controlling a standby operation, to be performed on a plurality of wireless communication schemes, by a terminal apparatus that performs wireless communications compatible with the plurality of wireless communication schemes, respectively, and the method is such that: an instruction on a standby operation that the terminal apparatus is to perform is received; a remaining amount of battery to be supplied to the terminal apparatus is inspected; when the remaining amount of battery is large, a standby operation according to the instruction is performed; and when the remaining amount of battery is small, a predetermined standby operation is performed regardless of contents of the instruction.

As the remaining amount of battery is getting lower, the number of antennas to be used for the standby operation among a plurality of antennas may be reduced. The contents of the standby operation controlled may be conveyed to the user.

Still another embodiment of the present invention relates also to a terminal apparatus. This apparatus comprises: a communication unit which performs wireless communications with a plurality of base station apparatuses compatible with a plurality of wireless communication schemes, respectively; an inspection unit which inspects a remaining amount of battery to be supplied to the communication unit; and a control unit which controls a standby operation that the communication unit is to perform on the plurality of base station apparatuses, based on the remaining amount of battery inspected by the inspection unit. The control unit defines degrees of priority for the plurality of wireless communication schemes, respectively. As the remaining amount of battery becomes low, the control unit sets long a time interval of the standby operation for a base station apparatus compatible with a wireless communication scheme having a low degree of priority.

The control unit may have the communication unit inspect whether or not, in a first state where the remaining amount of battery is large, a wireless communication is feasible with a base station apparatus compatible with the wireless communication scheme having a low degree of priority; and when the wireless communication is not feasible, the control unit may set long the time interval of the standby operation for a base station apparatus compatible with the wireless communication scheme having a low degree of priority. The control unit may have the communication unit inspect whether or not, in a second state where the remaining amount of battery is smaller than the first state, the wireless communication is feasible with a base station apparatus compatible with the wireless communication scheme having a low degree of priority; and when the wireless communication is not feasible, the control unit may stop the standby operation for a base station apparatus compatible with the wireless communication scheme having a low degree of priority. In a third state where the remaining amount of battery is smaller than the second state, the control unit may stop the standby operation for a base station apparatus compatible with the wireless communication scheme having a low degree of priority, regardless of whether the wireless communication with a base station apparatus compatible with the wireless communication scheme having a low degree of priority is feasible or not.

Still another embodiment of the present invention relates also to a terminal apparatus. This apparatus comprises: a communication unit which performs wireless communications with a plurality of base station apparatuses compatible with a plurality of wireless communication schemes, respectively; an inspection unit which inspects a remaining amount of battery to be supplied to the communication unit; and a reception unit which receives an instruction on a standby operation that the communication unit is to perform on the plurality of base station apparatuses; and a control unit which controls the standby operation in the communication unit, based on the remaining amount of battery inspected by the inspection unit and the instruction received by the reception unit. When the remaining amount of battery is large, the control unit performs a standby operation according to the instruction. When the remaining amount of battery is small, the control unit performs a predetermined standby operation regardless of contents of the instruction.

Still another embodiment of the present invention relates also to a method for controlling standby operations. This method is a method for controlling a standby operation, to be performed on a plurality of base station apparatuses, by a terminal apparatus that performs wireless communications with a plurality of base station apparatuses compatible with a plurality of wireless communication schemes, respectively, and the method is such that in that degrees of priority are defined for the plurality of wireless communication schemes, respectively, and as a remaining amount of battery becomes low after a remaining amount of battery to be supplied to the terminal has been inspected, a time interval of the standby operation for a base station apparatus compatible with a wireless communication scheme having a low degree of priority is set long.

In a first state where the remaining amount of battery is large, whether or not a wireless communication is feasible with a base station compatible with the wireless communication scheme having a low degree of priority is inspected; and when the wireless communication is not feasible, the time interval of the standby operation for a base station apparatus compatible with the wireless communication scheme having a low degree of priority may be set long. In a second state where the remaining amount of battery is smaller than the first state, whether or not the wireless communication is feasible with a base station apparatus compatible with the wireless communication scheme having a low degree of priority is inspected; and when the wireless communication is not feasible, the standby operation for a base station apparatus compatible with the wireless communication scheme having a low degree of priority may be stopped. In a third state where the remaining amount of battery is smaller than the second state, the standby operation for a base station apparatus compatible with the wireless communication scheme having a low degree of priority may be stopped, regardless of whether the wireless communication with a base station apparatus compatible with the wireless communication scheme having a low degree of priority is feasible or not.

Still another embodiment of the present invention relates also to a method for controlling standby operations. This method is a method for controlling a standby operation, to be performed on a plurality of base station apparatuses, by a terminal apparatus that performs wireless communications with a plurality of base station apparatuses compatible with a plurality of wireless communication schemes, respectively, and the method is such that: an instruction on a standby operation that the terminal apparatus is to perform is received; a remaining amount of battery to be supplied to the terminal apparatus is inspected; when the remaining amount of battery is large, a standby operation according to the instruction is performed; and when the remaining amount of battery is small, a predetermined standby operation is performed regardless of contents of the instruction.

Still another embodiment of the present invention relates also to a terminal apparatus. This terminal apparatus, comprises: a communication unit which performs wireless communications compatible with a first wireless communication scheme and a second wireless communication scheme whose degree of priority is higher than that for the first wireless communication scheme, respectively; and a control unit which determines a wireless communication scheme used when the communication unit performs wireless communications. The control unit determines an execution of a standby operation by the second wireless communication scheme, regardless of whether a communication by the second wireless communication scheme is feasible in the communication unit or not.

According to this embodiment, the standby operation is performed on a wireless communication scheme to which a high degree of priority among those of wireless communication schemes which can then be communicated is assigned. Thus, the usual and normal processing can be performed on a wireless communication scheme having a high degree of priority, whereas any unnecessary processing can be reduced as to a wireless communication scheme having a low degree of priority.

When the communication by the second wireless communication scheme is not feasible and a communication by the second wireless communication scheme is feasible, the control unit may determine the execution of standby operations for both the first and second wireless communication scheme. In this case, since the standby operations in both the communication schemes are performed, incoming calls or signals in the first wireless communication scheme can be reliably received. Even in the communication in the second communication scheme becomes feasible, this can be appropriately processed.

Still another embodiment of the present invention relates also to a terminal apparatus. This terminal apparatus comprises: a communication unit which performs wireless communications compatible with a plurality of wireless communication schemes, respectively; and a control unit which selects a wireless communication scheme used when the communication unit performs wireless communications. The control unit defines degrees of priority for the plurality of wireless communication schemes, respectively, and the control unit includes: means for specifying at least one wireless communication scheme whose degree of priority is high, among wireless communication schemes by which the communication unit is able to perform communications; and means for determining an execution of a standby operation by a wireless communication scheme whose degree of priority is higher than or equal to a degree of priority assigned to the specified wireless communication scheme and determining a stoppage of a standby operation by a wireless communication scheme whose degree of priority is lower than the degree of priority assigned to the specified wireless communication scheme.

According to this embodiment, the standby operation is performed on a wireless communication scheme to which a degree of priority higher than or equal to a high degree of priority among those of wireless communication schemes which can then be communicated is assigned. Thus, the usual and normal processing can be performed on a wireless communication scheme having a high degree of priority, whereas any unnecessary processing can be reduced as to a wireless communication scheme having a low degree of priority.

When the communication unit receives an incoming signal in a state where the standby operation is performed by the control unit, the communication unit inspects whether or not a communication is feasible by a wireless communication scheme having a lower degree of priority than a degree of priority assigned to a wireless communication scheme of the incoming signal; and the control unit may determine the execution of a wireless communication by a wireless communication scheme having a low degree of priority among wireless communication schemes by which the communication unit is able to perform communications. In this case, a wireless communication scheme having an as low as possible degree of priority is used, the congestion of traffic for the wireless communication scheme having a high degree of priority can be reduced.

When a wireless communication by a wireless communication scheme having a low degree of priority does not meet a predetermined quality among wireless communication schemes by which the communication unit is able to perform communications, the control unit may determine the execution of a wireless communication by a wireless communication scheme having a higher degree of priority than said degree of priority. In this case, even if the communication is feasible but the wireless quality is not satisfactory, the wireless communication scheme having a high degree of priority is used. Thus, the further deterioration of the wireless quality during the communication can be suppressed.

The terminal apparatus may further comprise a notification unit which conveys information on a wireless communication scheme selected in the control unit, to a user. In this case, the state of an operation can be conveyed to the user.

Another embodiment of the present invention relates to a communication method. This method is a method for determining a wireless communication scheme in a first wireless communication scheme and a second wireless communication scheme whose degree of priority is higher than that for the first wireless communication scheme, and the method is such that a standby operation by the second wireless communication scheme is performed regardless of whether a communication by the second wireless communication scheme is feasible or not.

Still another embodiment of the present invention relates to a communication method. This method is a method for selecting a wireless communication scheme used to perform wireless communications from among a plurality of wireless communication schemes, and the method is such that degrees of priority are defined for the plurality of wireless communication schemes, respectively, and at least one wireless communication scheme whose degree of priority is high, among wireless communication schemes by which a communication is able to be performed, is specified; a standby operation by a wireless communication scheme whose degree of priority is higher than or equal to a degree of priority assigned to the specified wireless communication scheme is executed; and a standby operation by a wireless communication scheme whose degree of priority is lower than the degree of priority assigned to the specified wireless communication scheme is stopped.

When an incoming signal is received in a state where the standby operation is performed, whether or not a communication is feasible by a wireless communication scheme having a lower degree of priority than a degree of priority assigned to a wireless communication scheme of the incoming signal is inspected; and the execution of a wireless communication by a wireless communication scheme having a low degree of priority among wireless communication schemes by which the communication unit is able to perform communications may be determined. When a wireless communication by a wireless communication scheme having a low degree of priority does not meet a predetermined quality among base stations with which communications are feasible, the execution of a wireless communication by a wireless communication scheme having a higher degree of priority than said degree of priority may be determined. In this case, even if the communication is feasible but the wireless quality is not satisfactory, the wireless communication scheme having a high degree of priority is used. Information on the selected wireless communication scheme may be conveyed to a user.

Still another embodiment of the present invention relates also to a terminal apparatus. This terminal apparatus comprises: a communication unit which performs wireless communications with a plurality of base station apparatuses compatible with a plurality of wireless communication schemes, respectively; and a control unit which selects a base station apparatus that the communication unit is to perform wireless communications. The control unit defines degrees of priority for the plurality of wireless communication schemes, respectively, and the control unit includes: means for specifying a base station apparatus compatible with a wireless communication scheme whose degree of priority is highest, among base station apparatuses that the communication unit is able to perform communications with; and means for determining an execution of a standby operation for a base station apparatus compatible with a wireless communication scheme whose degree of priority is higher than or equal to a degree of priority assigned to the specified base station apparatus and determining a stoppage of a standby operation for a base station apparatus compatible with a wireless communication scheme whose degree of priority is lower than the degree of priority assigned to the specified base station apparatus.

When the communication unit receives an incoming signal from a base station apparatus in a state where the standby operation is performed by the control unit, the communication unit inspects whether or not a communication is feasible with a base station apparatus compatible with a wireless communication scheme having a lower degree of priority than a degree of priority assigned to a base station apparatus which has received the incoming signal; and the control unit may determine the execution of a wireless communication with a base station apparatus compatible with a wireless communication scheme having a lowest degree of priority among base station apparatuses that the communication unit is able to perform communications with.

When a wireless communication with a base station apparatus compatible with a wireless communication scheme having a lowest degree of priority does not meet a predetermined quality among base station apparatuses that the communication unit is able to perform communications with, the control unit may determine the execution of a wireless communication with a base station apparatus compatible with a wireless communication scheme having a higher degree of priority than said degree of priority.

The terminal apparatus may further comprise a notification unit which conveys information on a base station apparatus selected in the control unit, to a user.

Still another embodiment of the present invention relates to a communication method. This method is a method for selecting a base station apparatus which is to perform wireless communications from among a plurality of base station apparatuses compatible with a plurality of wireless communication schemes, respectively, and the method is such that degrees of priority are defined for the plurality of wireless communication schemes, respectively, and a base station apparatus compatible with a wireless communication scheme having a highest degree of priority, among base station apparatuses with which a communication is able to be performed, is specified; a standby operation for a base station apparatus compatible with a wireless communication scheme whose degree of priority is higher than or equal to a degree of priority assigned to the specified base station apparatus is executed; and a standby operation for a base station apparatus compatible with a wireless communication scheme whose degree of priority is lower than the degree of priority assigned to the specified base station apparatus is stopped.

When an incoming signal is received from a base station apparatus in a state where the standby operation is performed, whether or not a communication is feasible with a base station apparatus compatible with a wireless communication scheme having a lower degree of priority than a degree of priority assigned to a base station apparatus which has received the incoming signal is inspected; and the execution of a wireless communication with a base station apparatus compatible with a wireless communication scheme having a lowest degree of priority among base station apparatuses that communications are feasible may be determined. When a wireless communication with a base station apparatus compatible with a wireless communication scheme having a lowest degree of priority does not meet a predetermined quality among base stations with which a communication is feasible, the execution of a wireless communication with a base station apparatus compatible with a wireless communication scheme having a higher degree of priority than said degree of priority may be determined. Information on the selected base station apparatus may be conveyed to a user.

It is to be noted that any arbitrary combination of the aforementioned constituting elements, and the implementation of the present invention in the form of a method, an apparatus, a system, a recording medium, a computer program and so forth may also be effective as and encompassed by the embodiments of the present invention.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE INVENTION

Figure 1:
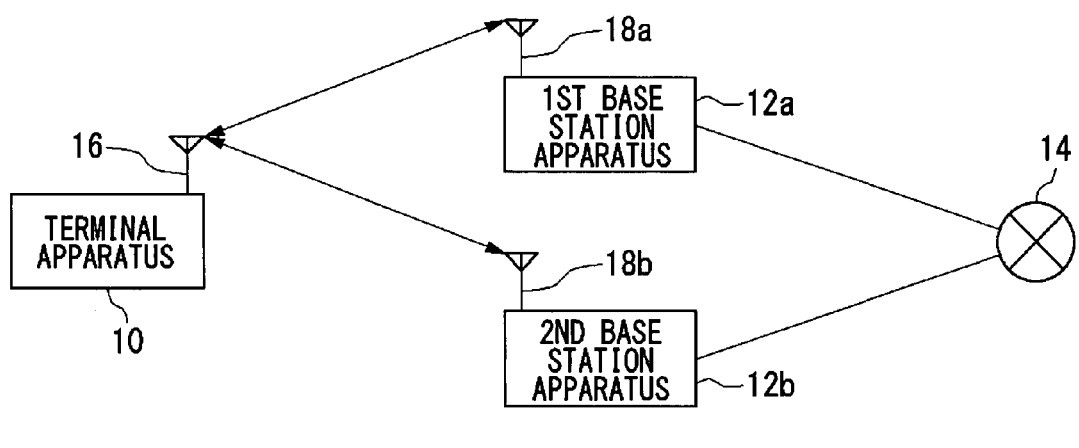
FIG. 1 illustrates a structure of a communication system according to an exemplary embodiment of the present invention.

The invention will now be described by reference to the preferred embodiments. This does not intend to limit the scope of the present invention, but to exemplify the invention.

Before describing the present invention in detail, an outline of the present invention will be described first. Exemplary embodiments according to the present invention relate to a base station apparatuses and terminal apparatuses that perform communications in a mobile communication system. The mobile communication system uses TDMA (Time Division Multiple Access) or CDMA (Code Division Multiple Access). In what is to follow, a description will be given of the latter, for example. Hereinbelow, a mobile communication system compatible with CDMA will be simply referred to as "CDMA". Besides the base station apparatuses in the mobile communication system, the terminal apparatuses according to the exemplary embodiments also perform communications with a base station of a fixed communication system. As fixed communication systems, there are communication systems complied with the IEEE802.16 standard or IEEE802.16e standard. They are also called WiMAX (World Interoperability for Microwave Access) which is a registered trademark.

If a terminal apparatus is not performing communications, a standby operation is performed. The standby operation is an operation where a signal transmitted from the base station apparatus is received periodically in the terminal apparatus and the received signal is checked if there is any incoming call or signal addressed to oneself. In general, this standby operation is performed intermittently. Since the terminal apparatus is driven by battery, the smaller power consumption is desired. On the other hand, since it is not known to the terminal apparatus whether it receives an incoming call or signal of CDMA or WiMAX, it is preferable that the standby operations for both CDMA and WiMAX be performed. However, if such a standby operation is performed in a case when the remaining amount of battery is low, the standby operation itself is undesirable in terms of achieving lower power consumption. For this reason, the terminal apparatus according to the present embodiment performs the following standby operations.

The terminal apparatus checks the remaining amount of battery. If the remaining amount of battery is large, the terminal apparatus will set both a time interval of the standby operation in CDMA and a time interval of the standby operation in WiMAX, to a standard value. If the remaining amount of battery is small, the terminal apparatus will not change the time interval of the standby operation in CDMA but set longer the time interval of the standby operation in WiMAX. Further, if the remaining amount of battery is smaller, the terminal apparatus will not change the time interval of the standby operation in CDMA but stop the standby operation in WiMax.

In general, the time interval of the standby operation in CDMA where a service area is so designed as to cover a wide area is fixed regardless of the remaining amount of battery. Thus the incoming calls and signals in CDMA can be received. On the other hand, when the remaining amount of battery is smaller, the time interval is set longer for WiMAX where the service area is more restricted than CDMA and thereby the power consumption is reduced.

FIG. 1 illustrates a structure of a communication system 100 according to an exemplary embodiment of the present invention. The communication system 100 includes a terminal apparatus 10, a first base station apparatus 12*a* and a second base station apparatus 12*b*, which will be generically referred to as "base station apparatus 12", and a network 14. The terminal apparatus 10 includes an antenna 16 for a terminal; the first base station apparatus 12*a* includes an antenna 18*a* for the first base station; and the second base station apparatus 12*b* includes an antenna 18*b* for the second base station. Here, the first base-station antenna 18*a* and the second base-station antenna 18*b* are generically referred to as "base-station antenna 18.

The first base station apparatus 12*a* corresponds to the above-described base station apparatus compatible with CDMA, whereas the second base station apparatus 12*b* corresponds to the above-described base station apparatus compatible with WiMAX. The network 14 includes a switchboard, a router (both not shown) and the like, which controls communications in the first base station apparatus 12*a* and the second base station apparatus 12*b*. The base station apparatus compatible with CDMA is a base station apparatus of a mobile communication system that performs communications with the terminal apparatus 10 multiplexed by CDMA. The base station apparatus compatible with WiMAX is a base station apparatus of a fixed communication system that performs communications with the terminal apparatus 10 multiplexed by OFDMA (Orthogonal Frequency Division Multiple Access). The detailed description of CDMA and WiMAX is omitted here.

The terminal apparatus 10 has a function to accommodate voice communications and data communications. The terminal apparatus 10 has a communication function compatible with CDMA and a communication function compatible with WiMAX. Accordingly, when connected with the first base station apparatus 12*a*, the terminal apparatus 10 performs communications using CDMA; and when connected with the second base station apparatus 12*b*, the terminal apparatus 10 performs communication using WiMAX. Even before performing communications, the terminal apparatus 10 also perform the standby operation on the base station apparatus 12*a* and the second base station apparatus 12*b*. A detailed description of standby operations will be given later.

Figure 2:
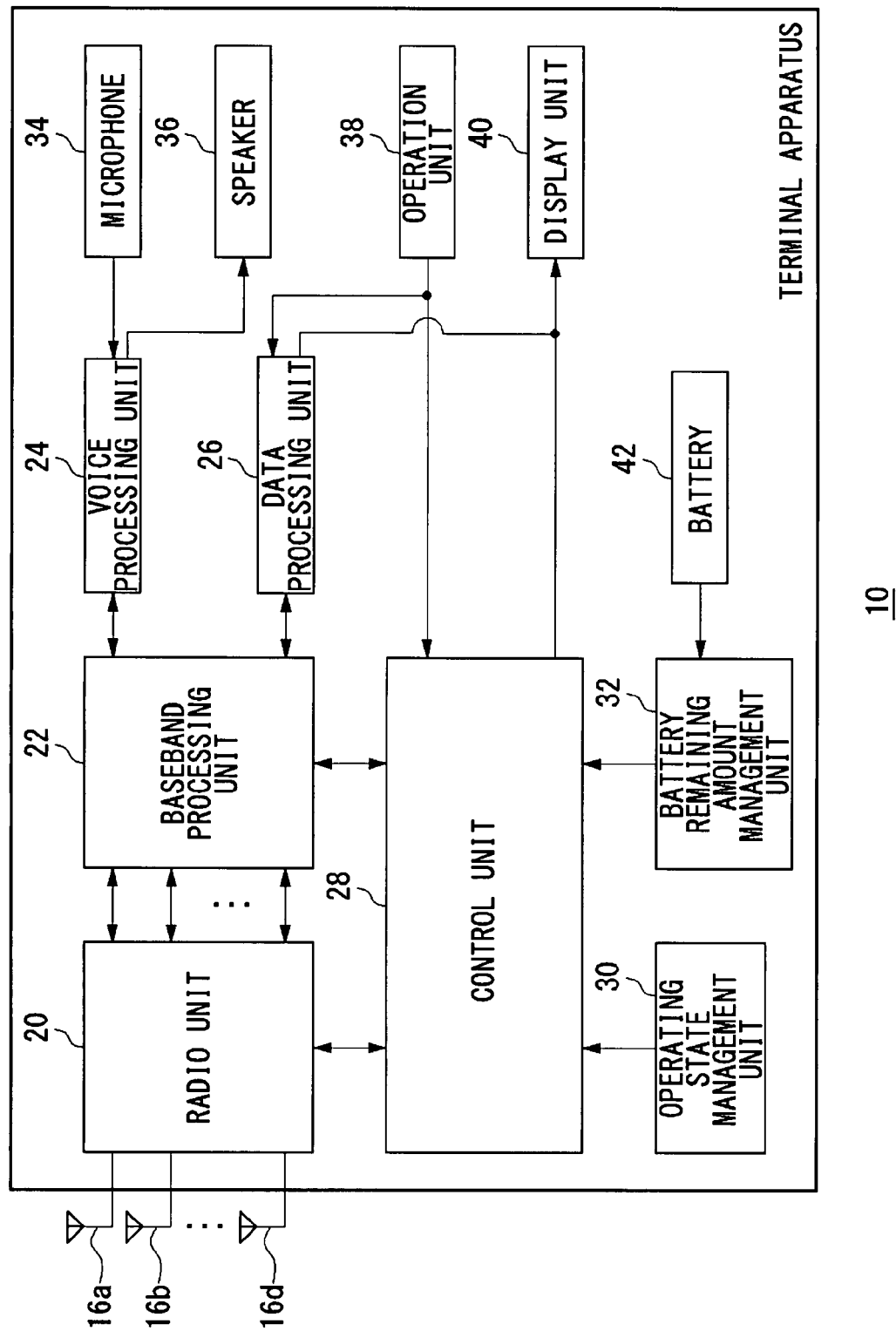
FIG. 2 shows a structure of a terminal apparatus shown in FIG. 1.

FIG. 2 shows a structure of the terminal apparatus 10. The terminal apparatus 10 includes a first terminal antenna 16*a*, a second terminal antenna 16*b*, . . . and a fourth terminal antenna 16*d*, which are generically referred to as "terminal antenna 16", a radio unit 20, a baseband processing unit 22, a voice processing unit 24, a data processing unit 26, a control unit 28, an operating state management unit 30, a battery remaining amount management unit 32, a microphone 34, a speaker 36, an operation unit 38, a display unit 40, and a battery 42.

The radio unit 20 is equipped with a plurality of antennas 16. Assume herein that the number of antennas 16 is "4". As a receiving operation, the radio unit 20 carries out frequency conversion of radiofrequency signal received by the antennas 16 so as to produce baseband signals. Further, the radio unit 20 outputs the baseband signals to the baseband processing unit 22. The baseband signal, which is composed of in-phase components and quadrature components, shall generally be transmitted by two signal lines. For the clarity of Figure, the baseband signal is presented here by a single signal line only. An AGC (Automatic Gain Control) unit and an A-D conversion unit are also included in the radio unit 20.

As a transmit processing, the radio unit 20 carries out frequency conversion of baseband signals inputted from the baseband processing unit 22 so as to generate radiofrequency signals. Although in general the radiofrequency used in CDMA differs from that used in WiMAX, they are herein generically referred to and called simply as a radiofrequency. Further, the radio unit 20 outputs the radiofrequency signal to the terminal antenna 16. That is, the radio unit 20 transmits the radiofrequency signal from the terminal antenna 16. A PA (Power Amplifier) and a D-A conversion unit are also included in the radio unit 20. With the above-described processing, the radio unit 20 performs communications with a plurality of base station apparatuses 12 compatible with a plurality of wireless communication systems, respectively. However, whether the first base station apparatus 12*a* or the second base station apparatus 12*b* is to be selected as a communication party is determined based on an instruction from the control unit 28.

As a receive processing, the baseband processing unit 22 demodulates the baseband signals inputted from the radio unit 20. In so doing, the baseband processing unit 22 may perform adaptive array signal processing or diversity processing on a plurality of baseband signals. Here, a plurality of baseband signals correspond respectively to the radiofrequency signals received by a plurality of terminal antennas 16. Also, the adaptive array signal processing derives receiving weight vectors for a plurality of baseband signals, respectively, and weights the thus derived receiving weight vectors with a plurality of baseband signals. After the weight vectors are weighted with the baseband signals, they are summed up. If this technique is not used, a known technique may be used to realize the adaptive array signal processing. On the other hand, the selective diversity, the equal gain combining diversity, the maximum ratio combining diversity or the like may be carried out as a diversity processing.

If a received baseband signal is compatible with CDMA, the baseband processing unit 22 will perform despread processing as a receive processing. If the received baseband signal is compatible with WiMAX, the baseband processing unit 22 will perform FFT (Fast Fourier Transform) as a receiving processing. Further, the baseband processing unit 22 also performs decoding. Finally, if the received baseband signal corresponds to voice signals, the baseband processing unit 22 will output the processed signals to the voice processing unit 24. If, on the other hand, the received baseband signals correspond to data signals, the baseband processing unit 22 will output the processed signals to the data processing unit 26.

As a transmit processing, the baseband processing unit 22 modulates signals inputted from the voice processing unit 24 or the data processing unit 26. Here, voice signals are inputted from the voice processing unit 24, whereas data signals are inputted from the data processing unit 26. Similar to the receive processing, adaptive array signal processing or diversity processing may be performed on the inputted signals. In the adaptive array signal processing, a transmission weight vector is derived based on a receiving weight vector, and the modulated signals are weighted with the derived transmission weight vector. Then the weighted signals are outputted as the baseband signals. In the diversity processing, any of the modulated signals is selected so that radiofrequency signals are transmitted from any of a plurality of terminal antennas 16. When the signals to be transmitted are compatible with CDMA, the baseband processing unit 22 performs spread processing as the transmit processing. When the signals to be transmitted are compatible with WiMAX, the baseband processing unit 22 performs IFFT as the transmit processing. Further, the baseband processing unit 22 performs coding.

The voice processing unit 24 performs processing for voice communications such as telephone communications. The voice processing unit 24 is connected with the microphone 34 and the speaker 36. Audio or voice is inputted from the microphone 34 and the inputted voice is coded. Then the coded signals are outputted to the baseband processing unit 22 as the above-described voice signals. Also, the voice processing unit 24 receives the input of the above-described voice signals from the baseband processing unit 22, and reproduces voice by decoding them. The reproduced voice is outputted from the speaker 36. A known technique may be used for the coding and decoding in the voice processing unit 24 and therefore the explanation thereof is omitted here.

The data processing unit 26 performs processing for data communications, such as electronic mail and the Internet connection. The data processing unit 26 is connected with the operation unit 38 and the display unit 40. User's instructions and data (hereinafter referred to as "data and the like") are inputted from the operation unit 38. The inputted data and the like are coded, and the coded data and the like are outputted to the baseband processing unit 22 as data signals. The processing unit 26 receives the input of the above-mentioned data signals from the baseband processing unit 22 and decodes them so as to reproduce the data and the like. The reproduced data are displayed on the display unit 40.

The battery 42 supplies power to the entire terminal apparatus 10 via a power-transmission line (not shown here). The battery remaining amount management unit 32 inspects the remaining amount of the battery 42. Here, the inspection is carried out at a predetermined cycle. The battery remaining amount management unit 32 conveys the inspection results to the control unit 28. Note that the inspection may be conducted based on an instruction from the control unit 28.

The control unit 28 controls the standby operation that the radio unit 20 and the baseband processing 22 are to perform. The standby operation is an operation in which the contents of signals transmitted from a base station apparatus 12 (not shown in FIG. 2) are received periodically and then whether or not there is any incoming call or signal addressed to oneself in the received signal is checked. In general, the base station apparatus 12 transmits a broadcast signal at predetermined time intervals. The control unit 28 of the terminal apparatus 10 receives the broadcast signal via the radio unit 20 and the baseband processing unit 22. The broadcast signal contains a number by which to identify the terminal apparatus 10 that is the destination of the signal.

When the control unit 28 verifies the arrival of an incoming call or signal to oneself, the control unit 28 requests the base station apparatus to allocate a channel in a similar manner to an outgoing transmission (outgoing call or the like). Thereafter, when the channel allocation is done by the base station apparatus 12, communication is performed between the terminal apparatus 10 and the base station apparatus 12. As described above, since the terminal apparatus 10 is capable of handling a plurality of wireless communication systems, the control unit 28 performs standby operations corresponding respectively to a plurality of wireless communication systems. For example, the control unit 28 performs a standby operation corresponding to CDMA, on the first base station apparatus 12a via the radio unit 20 and the baseband processing unit 22, and also performs a standby operation corresponding to WiMax on the second base station apparatus 12b.

The above standby operation is generally performed intermittently. Based on the battery remaining amount inspected by the battery remaining amount management unit 32, the control unit 28 controls the standby operations that a communication unit is to perform on a plurality of base station apparatuses 12. Here, in particular, the control unit 28 controls the time intervals of the standby operation. More specifically, the control unit 28 stores a table that associates, in advance, a threshold value concerning the remaining battery amount with a threshold value concerning an operation that satisfies the threshold value. By using this table the control unit 28 determines the time interval of the standby operation. Further, the control unit 28 instructs a standby operation to be performed at the thus determined interval, to the radio unit 20 and the baseband processing unit 22. The control unit 28 may output the determined contents to the display unit 40. The display unit 40 informs a user of the contents of the standby operation controlled by the control unit 28.

Figure 3:
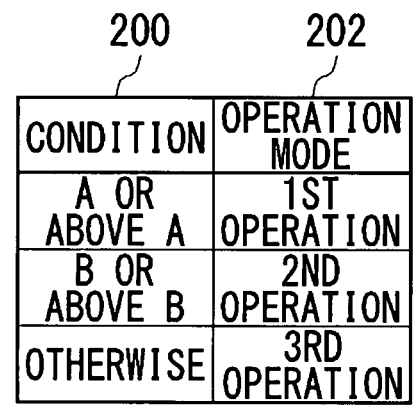
FIG. 3 illustrates a data structure of control requirements stored in a control unit of FIG. 2.

FIG. 3 illustrates a data structure of control requirements stored in the control unit 28. This corresponds to the above-described table. A condition column 220 indicates threshold values. Assume herein that the value of "A" is larger than that of "B". Thus, "A or above A" at the top corresponds to a state where the remaining amount is large, whereas "otherwise" at the bottom corresponds to a state where the remaining amount is small. In an operation mode column 202, an operation that meets each requirement is indicated as "first operation" to "third operation". Refer back to FIG. 2.

In the course of explaining the "first operation" to the "third operation", it is assumed that the control unit 28 defines a degree of priority for each of a plurality of wireless communication systems. Here, the degree of priority is so set that the degree of priority for CDMA is higher than that for WiMAX. Standard time intervals are set beforehand for the standby operations in a plurality of wireless communication systems, respectively. The standard time intervals may be set to an identical value or different values among a plurality of wireless communication systems.

In the "first operation", the control unit 28 has the radio unit 20 and the baseband processing inspect whether or not the wireless communication can be performed with a base station apparatus 12, namely the second base station apparatus 12b, compatible with a wireless communication system having a low degree of priority. For example, if the broadcast signal transmitted from the second base station apparatus 12b can be received, it will be concluded that the wireless communication with the second base station apparatus 12b is feasible; and if the broadcast signal transmitted from the second base station apparatus 12b cannot be received, it will be concluded the wireless communication with the second base station apparatus 12b is not feasible. In the case when the wireless communication is not possible, the control unit 28 sets the time interval used for the standby operation for the second base station apparatus 12b long. On the other hand, where the wireless communication is possible, the control unit 28 retains the time interval used for the standby operation for the second base station apparatus 12b intact at the standard value. Note that the time interval used for the standby operation for the first base station apparatus 12a is retained intact at the standard value.

In the "second operation", the control unit 28 has the radio unit 20 and the baseband processing inspect whether or not the wireless communication can be performed with the second base station apparatus 12b. If the wireless communication with the second base station apparatus 12b is not feasible, the control unit 28 will stop the standby operation for the second base station apparatus 12b. This corresponds to the fact that the time interval used for the standby operation for the second base station apparatus 12b is set to the maximum value. If, on the other hand, the wireless communication is feasible, the time interval set by the control unit 28 for the standby operation for the second base station apparatus 12b will depend on whether the wireless communication with the base station 12 compatible with a wireless communication system with a high degree of priority, namely the first base station apparatus 12a, is possible or not. More specifically, if the wireless communication with the first base station apparatus 12a is possible, the control unit 28 will set the time interval used for the standby operation for the second base station apparatus 12a long; and if the wireless communication with the first base station apparatus 12a is not possible, the control unit 28 will retain the time interval used for the standby operation for the second base station apparatus 12b intact at the standard value. Note that the time interval used for the standby operation for the first base station apparatus 12a is retained intact at the standard value.

In the "third operation", the control unit 28 stops the standby operation for the base station apparatus 12b regardless of whether the wireless communication with the second base station apparatus 12b is feasible or not. Also, the control unit 28 has the radio unit 20 and the baseband processing unit 22 inspect whether the wireless communication with the first base station apparatus 12a is possible or not. If the wireless communication is not possible, the control unit 28 will set the time interval used for the standby operation for the first base station apparatus 12a long. If, on the other hand, the wireless communication with the first base station apparatus 12a is possible, the control unit 28 will retain the time interval used for the standby operation for the first base station apparatus 12a intact at the standard value.

In this manner, as the battery remaining amount becomes smaller, the control unit 28 sets longer the time interval used for the standby operation for a base station apparatus 12 compatible with a wireless system with a low degree of priority. This helps lower the power consumption. In the above description, the control unit 28 selects a base station apparatus 12 on which the standby operation is to be performed. This is equivalent to selecting a wireless communication system on which the standby operation is to be performed. As the remaining amount of battery becomes smaller, the control unit 28 reduces the number of terminal antennas 16 to be used for the standby operation, among a plurality of terminal antennas 16. For example, in the case of the "first operation", four terminal antennas 16 are used; in the case of the "second operation", two terminal antennas 16 are used; and in the case of the "third operation", a single terminal antenna 16 is used. That is, if the remaining amount of battery is larger, the maximum number of terminal antennas 16 is used; if the remaining amount of battery is smaller, a single terminal antenna 16 will be used; and if the remaining amount of battery is in between large and small, the number of terminal antennas 16 between the maximum number thereof and a single antenna will be used.

The operating state management unit 30 manages an operating state of the terminal apparatus 10 as a whole. For example, the operating states such as "standby operation" and "communication being performed" ("during communication") are managed. Here, if an incoming call/signal or outgoing call/signal is placed during a "standby operation", the state transits to the "during communication". And when the operation of "during communication" is over, the state transits to the "standby operation". When an outgoing transmission is performed, a signal indicating that an outgoing transmission will be conducted is conveyed to the control unit 28 from the operating state management unit 30. The control unit 28 selects a wireless system to be used for the outgoing transmission, from among a plurality of wireless communication systems. The radio unit 20 and the baseband processing unit 22 performs the outgoing transmission using the selected wireless communication system. The destination for this communication is specified by the operation unit 38, for example.

In terms of hardware, this structure described as above can be realized by an arbitrary CPU, memory and other LSIs of a computer. In terms of software, it can be realized by memory-loaded programs which have communication functions and the like, but drawn and described herein are function blocks that are realized in cooperation with those. Hence, it is understood by those skilled in the art that these function blocks can be realized in a variety of forms such as by hardware only, software only or the combination thereof.

Figure 4:
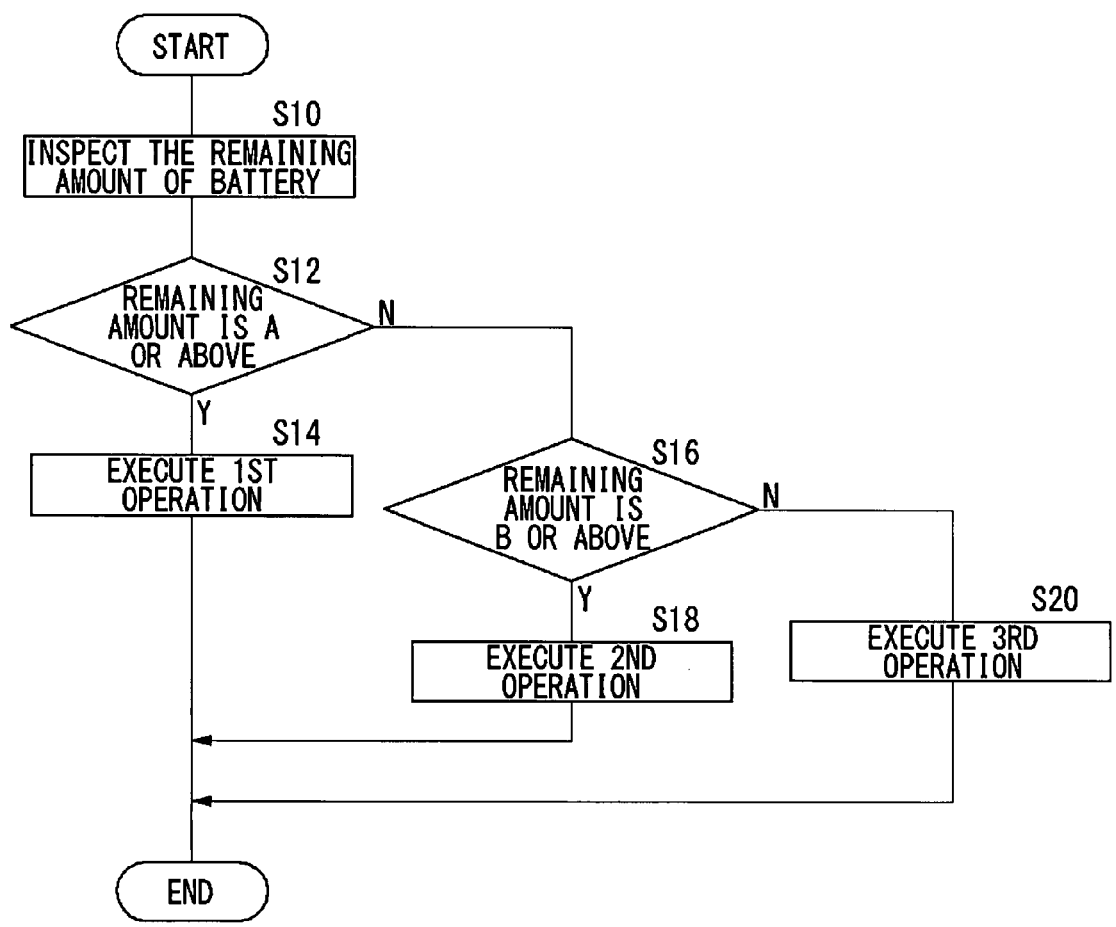
FIG. 4 is a flowchart showing a procedure for switching a standby operation in a terminal apparatus of FIG. 1.

An operation of the terminal apparatus 10 structured as above is now described. FIG. 4 is a flowchart showing a procedure for switching the standby operation in the terminal apparatus 10. The battery remaining amount management unit 32 inspects the remaining amount of battery (S10). If the remaining amount of battery is "A" or above (Y of S12), the control unit 28 will determine the execution of the first operation (S14). If the remaining amount of battery is not "A" or above (N of S12) and the remaining amount of battery is "B" or above (Y of S16), the control unit 28 will determine the execution of the second operation (S18). If the remaining amount of battery is not "B" or above (N of S16), the control unit 28 will determine the execution of the third operation (S20). Then the processing comes to an end.

Figure 5:
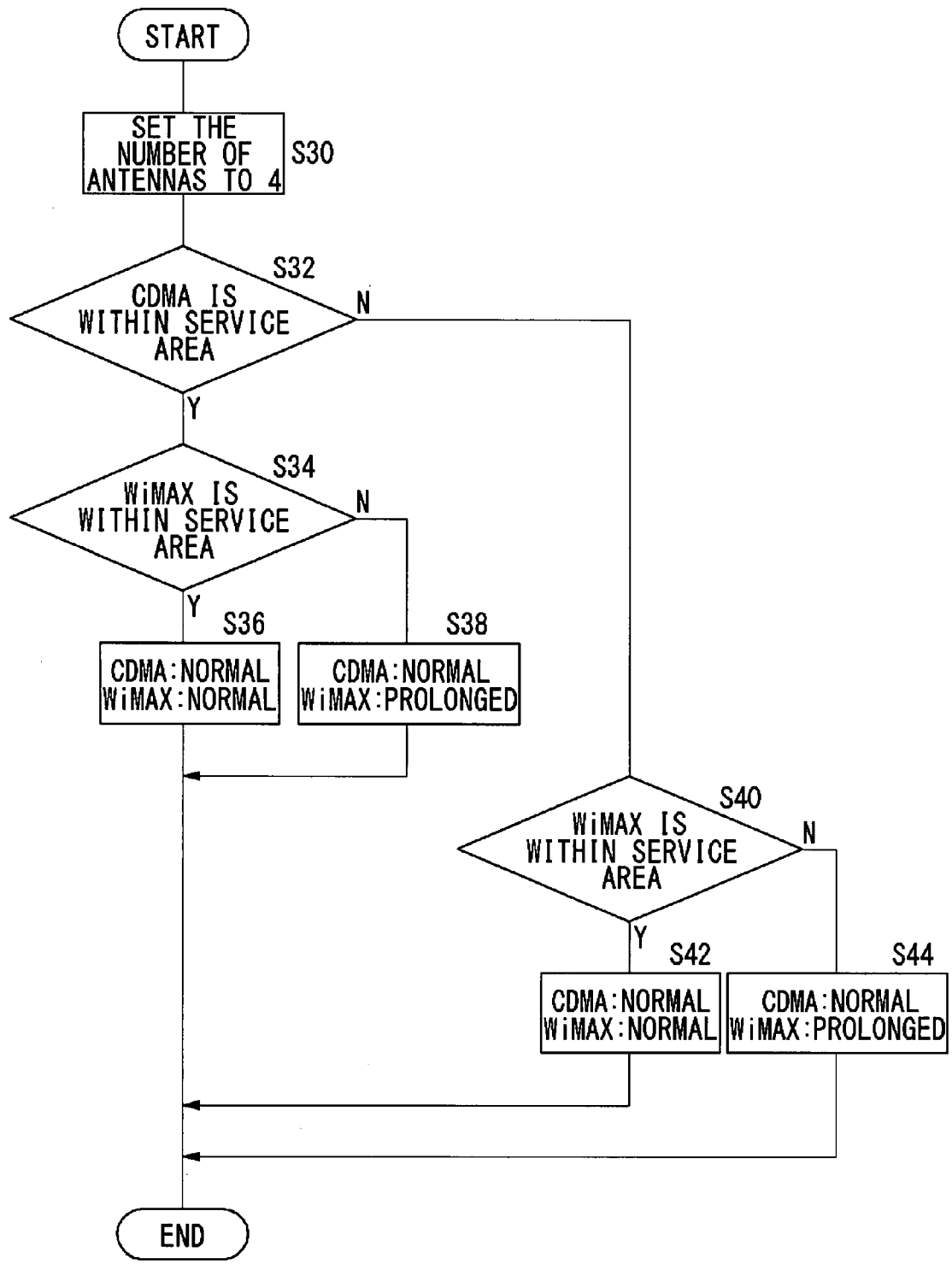
FIG. 5 is a flowchart showing a procedure for processing a first operation in a terminal apparatus of FIG. 1.

FIG. 5 is a flowchart showing a procedure for processing the first operation in the terminal apparatus 10. FIG. 5 corresponds to Step 1 in FIG. 4. The control unit 28 sets the number of terminal antennas 16 in use to "4" (S30). If CDMA is found to be within a service area (Y of S32) and WiMAX is also within a service area (Y of S34) as a result of the inspection by the radio unit 20 and the baseband processing unit 22, the control unit 28 will set the time interval of the standby operation for CDMA to a normal value and set the time interval of the standby operation for WiMAX to a normal value, too (S36). Here, the normal value corresponds to the above-described standard value. If WiMAX is not within the service area (N of S34), the control unit 28 will set the time interval of the standby operation for CDMA to the normal value and set the time interval of the standby operation for WiMAX to a prolonged value (S38). Here the prolonged value corresponds to the above-described "long" or "longer" value.

If CDMA is not within the service area (N of S32) and WiMAX is within the service area (Y of S40) as a result of the inspection by the radio unit 20 and the baseband processing unit 22, the control unit 28 will set the time interval of the standby operation for CDMA to the normal value and set the time interval of the standby operation for WiMAX to the normal value (S42). If WiMAX is not within the service area (N of S40), the control unit 28 will set the time interval of the standby operation for CDMA to the normal value and set the time interval of WiMAX to a prolonged value (S44). Then the processing is terminated.

Figure 6:
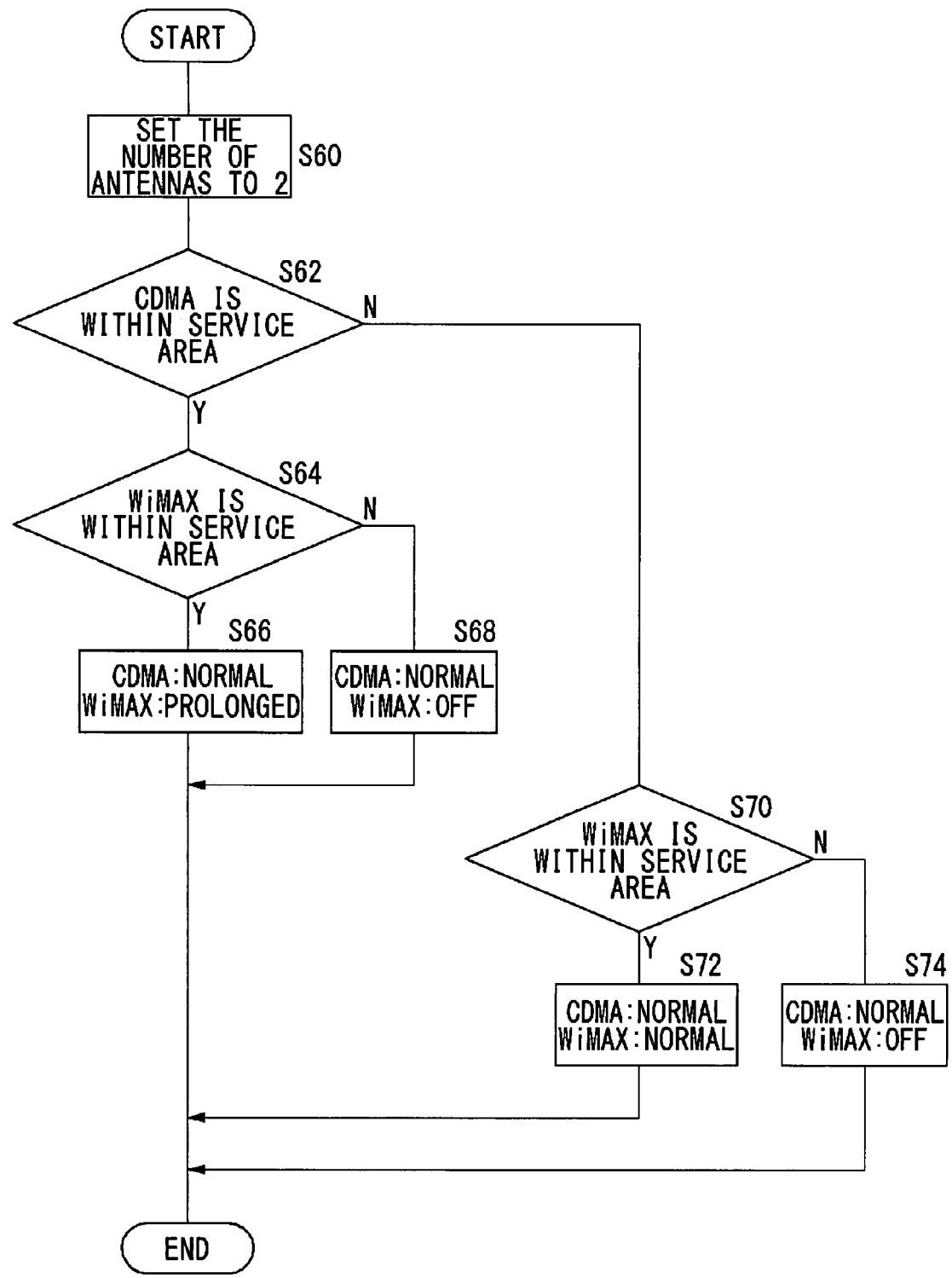
FIG. 6 is a flowchart showing a procedure for processing a second operation in a terminal apparatus of FIG. 1.

FIG. 6 is a flowchart showing a procedure for processing the second operation in the terminal apparatus 10. FIG. 6 corresponds to Step 18 in FIG. 4. The control unit 28 sets the number of terminal antennas 16 in use to "2" (S60). If CDMA is found to be within a service area (Y of S62) and WiMAX is also within a service area (Y of S64) as a result of the inspection by the radio unit 20 and the baseband processing unit 22, the control unit 28 will set the time interval of the standby operation for CDMA to a normal value and set the time interval of the standby operation for WiMAX to a prolonged value (S66). If WiMAX is not within the service area (N of S64), the control unit 28 will set the time interval of the standby operation for CDMA to the normal value and set the time interval of the standby operation for WiMAX to OFF (S68).

If CDMA is not within the service area (N of S62) and WiMAX is within the service area (Y of S70) as a result of the inspection by the radio unit 20 and the baseband processing unit 22, the control unit 28 will set the time interval of the standby operation for CDMA to the normal value and set the time interval of the standby operation for WiMAX to the normal value, too (S72). If WiMAX is not within the service area (N of S70), the control unit 28 will set the time interval of the standby operation for CDMA to the normal value and set the time interval of the standby operation for WiMAX to OFF (S74). Then the processing is terminated.

Figure 7:
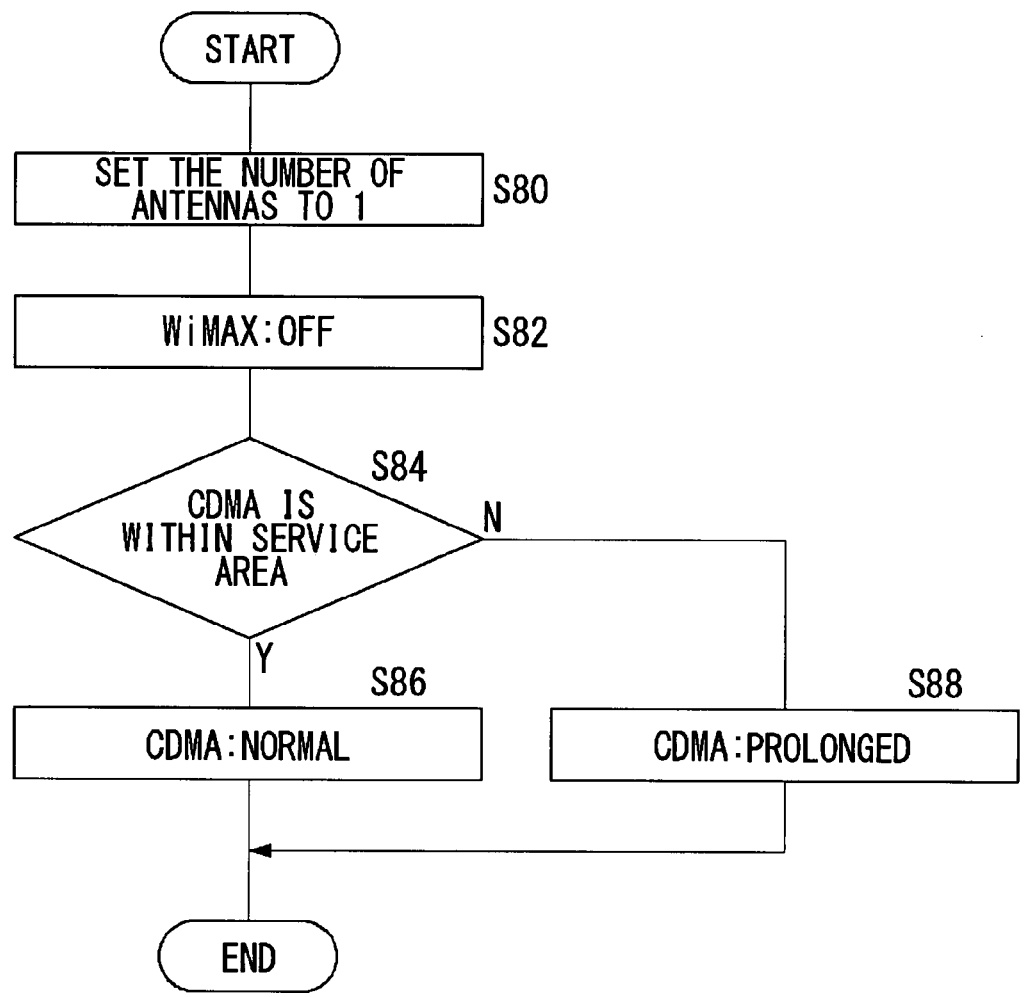
FIG. 7 is a flowchart showing a procedure for processing a third operation in a terminal apparatus of FIG. 1.

FIG. 7 is a flowchart showing a procedure for processing the third operation in the terminal apparatus 10. FIG. 7 corresponds to Step 20 in FIG. 4. The control unit 28 sets the number of terminal antennas 16 in use to "1" (S80). The control unit 28 sets the standby operation for WiMAX to OFF (S82). If CDMA is found to be within a service area as a result of the inspection by the radio unit 20 and the baseband processing unit 22 (Y of S84), the control unit 28 will set the time interval of the standby operation for CDMA to the normal value (S86). If CDMA is not within the service area (N of S84), the control unit 28 will set the time interval of the standby operation for CDMA to the normal value and set the time interval of the standby operation for CDMA to a prolonged value (S88). Then the processing is terminated.

A modification of the present invention will now be described. Similar to the exemplary embodiments, the modification relates also to the standby operation in the terminal apparatus. Similar to the exemplary embodiments, the terminal apparatus according to the modification is compatible with a plurality of communication systems. In general it is preferable that the standby operation of such a terminal apparatus be executed with low power consumed. However, there are cases where the terminal apparatus receives an instruction concerning the standby operation from the user. Accordingly, it is desirable to execute the standby operation in accordance with the user's instruction.

The structure of the terminal apparatus 10 according to the modification is of the same type as the terminal apparatus shown in FIG. 2. The operation unit 38 receives an instruction on the standby operation that the radio unit 20 and the baseband processing unit 22 are to perform on a plurality of base station apparatuses 12. The instruction concerning the standby operation will be discussed later. As described above, the battery remaining amount management unit 32 inspects the remaining amount of battery. Based on the remaining amount inspected by the battery remaining amount management unit 32 and the instruction received by the operation unit 38, the control unit 28 controls the standby operation in the baseband processing unit 22. More specifically, if the remaining amount of battery is larger than a threshold value, the control unit 28 will carry out a standby operation according to the instruction. And if the remaining amount of battery is lower than or equal to the threshold value, the control unit 28 will perform a predetermined standby operation regardless of the contents of the instruction. Here, the predetermined standby operation corresponds to the above-described "third operation", for example. The display unit 40 may display the contents of a standby operation determined by the control unit 28.

An instruction on a standby operation will now be described. Though the time interval of the standby operation may be inputted while the user is operating the operation unit 38, a plurality of predetermined modes are defined in consideration of the user's convenience. While operating the operation unit 38, the user selects any of the plurality of modes. Here, the types of a plurality of modes defined include, for example, "high-speed communication mode", "low power consumption mode", "telephone mode", and "Web/mail mode". And the time intervals of the standby operation are respectively defined for the modes in units of wireless communication system. Since the time interval for each mode may be set arbitrarily, the explanation thereof is omitted here.

The switching of the modes by the operation unit 38 is executed as follows. The user first presses down on a mode switching button (now shown). The display 40 transits to a mode selection screen. While using the operation unit 38, the user selects a mode of his/her choice. The control unit 28 sets the selected mode to the radio unit 20 and the baseband processing unit 22. When an application to run on the terminal apparatus 10 is started, the control unit 28 may determine a band required by the application and then automatically switch the mode. Further, when the application is to be started, the control unit 28 may inquire the user, via the display unit 40, about whether the mode shall be "automatically switched or switched by the user himself/herself" and may execute the processing according to the result thereof.

Figure 8:
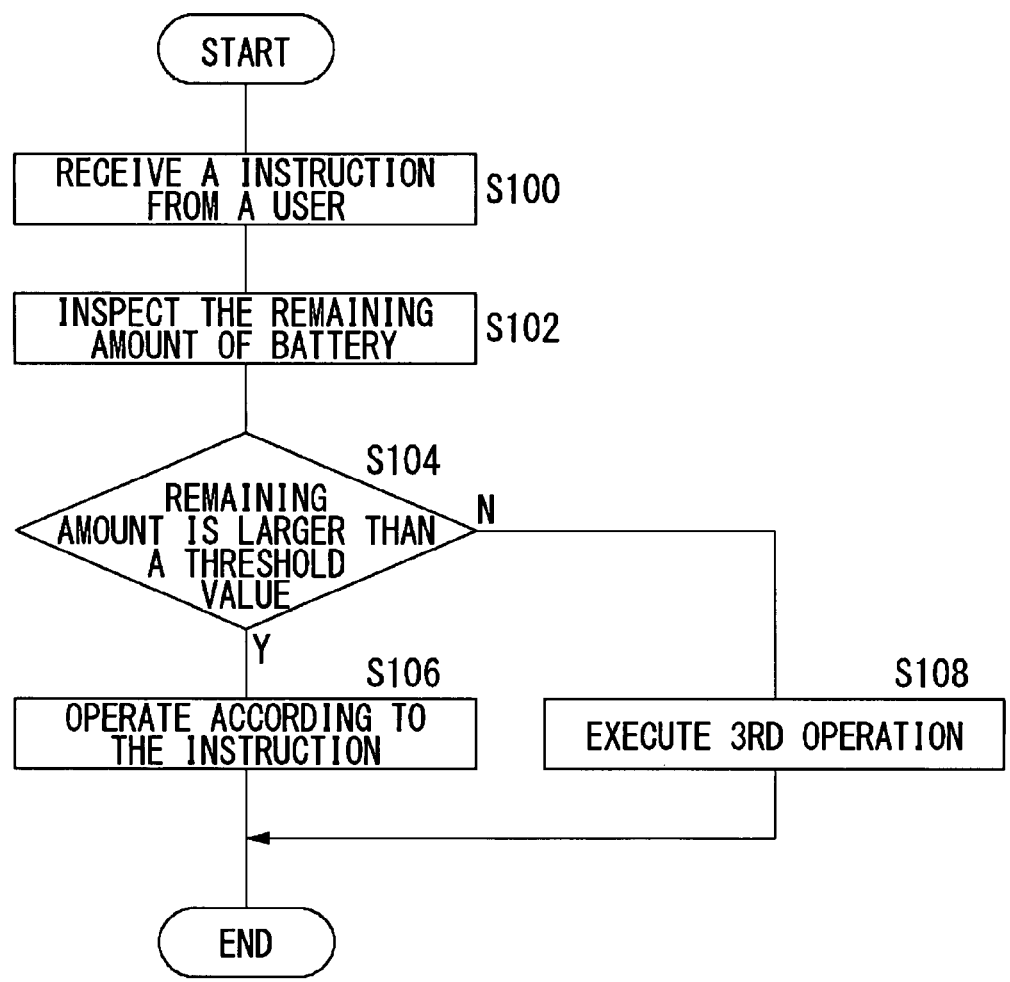
FIG. 8 is a flowchart showing a procedure for switching a standby operation according to a modification of the present invention.

An operation of the terminal apparatus 10 structured as above will now be described. FIG. 8 is a flowchart showing a procedure for switching a standby operation according to a modification of the present invention. The operation unit 38 receives an instruction from the user (S100). The battery remaining amount management unit 32 inspects the remaining amount of battery (S102). If the remaining amount of battery is larger than a threshold value (Y of S104), the control unit 28 will determine an operation according to the instruction, as a standby operation in the radio unit 20 and the baseband processing unit 22 (S106). If the remaining amount of battery becomes equal to or smaller than the threshold value (N of S104), the control unit 28 will determine the execution of the third operation as a standby operation in (S108). Then the processing comes to an end.

Another modification of the present invention is now described. Similar to what has been described so far, the terminal apparatus according to this modification is also compatible with a plurality of communication systems. In the terminal apparatus according to this modification, the possibility that incoming calls or signals can be received is raised. At the same time, the standby operation to reduce the power consumption is executed and the other communication systems are effectively used when the incoming calls or signals are received. When CDMA is usable in the standby operation, the terminal apparatus stops the standby operation for WiMAX. When, on the other hand, CDMA is not usable, the terminal apparatus performs the standby operation for CDMA and WiMAX.

It is assumed herein that the service area of CDMA is larger than that of WiMAX. Thus, the probability of receiving incoming calls or signals is enhanced if the standby operation for CDMA is executed in preference to that for WiMAX. Suppose that WiMAX is usable when the incoming call or signal is received using CDMA. Then, the terminal apparatus performs a handover from CDMA to WiMAX and then performs communications by WiMAX. When, on the other hand, the incoming call or signal is received using WiMAX, the terminal apparatus performs communications by WiMAX. That is, the terminal apparatus preferentially uses CDMA in the standby operation and preferentially uses WiMAX in the communication after having received the incoming call or signal.

The structure of the terminal apparatus 10 according to the another modification is of the same type as the terminal apparatus shown in FIG. 2. The control unit 28 selects a base station apparatus 12 which the radio unit 20 and the baseband processing unit 22 are to perform wireless communications with. Here, the selection is made between the first base station apparatus 12a and the second base station apparatus 12b. Note that the two base station apparatuses 12 may be selected. Similar to the exemplary embodiments, the control unit 28 defines degrees of priority for a plurality of wireless communication systems, respectively. It is also assumed here that the same degree of priority is defined for CDMA and WiMAX.

The standby operation is first described. The control unit 28 identifies a base station apparatus 12, compatible with a communication system having the highest degree of priority, among the base station apparatuses 12 that can be communicated with the radio unit 20 and the baseband processing unit 22. For example, if the first base station apparatus 12a can be communicated with the terminal apparatus 10, the control unit 28 will specify the first base station apparatus 12a. And if the first base station apparatus 12a cannot be communicated therewith but the second base station apparatus 12b can be communicated therewith, the control unit 28 will specify the second base station apparatus 12b. A method for detecting a base station apparatus 12 that can be communicated with the terminal apparatus 10 is applied the same way as with the exemplary embodiment and therefore the repeated description thereof is omitted here.

The control unit 28 determines a standby operation for a base station apparatus 12 compatible with a wireless communication system having a degree of priority greater than or equal to the degree of priority assigned to the specified base station apparatus 12. For example, if the first base station apparatus 12a is specified, the control unit 28 will determine the execution of the standby operation for the first base station apparatus 12a; and if the second base station apparatus 12b is specified, the control unit 28 will determine the execution of the standby operation for the second base station apparatus 12b. On the other hand, the control unit 28 determines the stopping of a base station apparatus 12 compatible with a wireless communication system having a degree of priority less than the degree of priority assigned to the specified base station apparatus 12. For example, if the first base station apparatus 12a is specified, the control unit 28 will determine the stopping of the standby operation for the second base station apparatus 12b. Note that the time interval of the standby operation is set to the above-described standard value.

Next, the incoming call/signal receiving operation is described. The standby operation is performed on the radio unit 20 and the baseband processing unit 22. For example, the standby operation is performed on the first base station apparatus 12a, or the standby operation is performed on both the first base station apparatus 12a and the second base station apparatus 12b. In such a state, when an incoming call or signal is received from the base station apparatus 12 via the radio unit 20 and the baseband processing unit 22, the control unit 28 inspects whether or not the communication is possible with a base station apparatus 12 compatible with a wireless communication system having a degree of priority less than the degree of priority assigned to the base station apparatus 12 that has received the incoming call or signal. For example, when the incoming call or signal is received from the first base station apparatus 12a, the control unit 28 inspects whether or not the communication is possible with the second base station apparatus 12b. When, on the other hand, the incoming call or signal is received from the second base station apparatus 12b, the control unit 28 does not execute the inspection.

The control unit 28 determines the execution of wireless communication with a base station apparatus 12 compatible with a wireless communication system having the lowest degree of priority, among the base station apparatuses 12 that the radio unit 20 and the baseband processing unit 22 can communicate with. For example, when communication is possible with the first base station apparatus 12a and the second base station apparatus 12b, the control unit 28 determines the execution of wireless communication with the second base station apparatus 12b. When communication is possible with the first base station apparatus 12a only, the control unit 28 determines the execution of wireless communication with the first base station apparatus 12a. When communication is possible with the second base station apparatus 12b only, the control unit 28 determines the execution of wireless communication with the second base station apparatus 12b. The radio unit 20 and the baseband processing unit 22 continue performing the incoming call/signal receiving operation on the base station apparatus 12 determined by the control unit 28. A known technique may be used for the incoming call/signal receiving operation and therefore the explanation thereof is omitted here.

There are cases where the wireless communication system compatible with a base station apparatus 12 that has received the incoming call or signal differs from the wireless communication system where the execution of wireless communication has been determined by the control unit 28. For example, there is a case where an incoming call or signal is received from the first base station apparatus 12a and the execution of wireless communication with the second base station apparatus 12b has been determined. In this case, the radio unit 20 and the baseband processing unit 22 continue the incoming call/signal receiving operation for the first base station apparatus that has received the incoming call or signal. Thereafter, the radio unit 20 and the baseband processing unit 22 perform a handover from the first base station apparatus 12a to the second base station apparatus 12b, namely from CDMA to WiMAX.

In order to realize the handover from the first base station apparatus 12a to the second base station apparatus 12b, the terminal apparatus 10 sends, via the first base station apparatus 12a, a handover start request signal to the second base station apparatus 12b via a not-shown switchboard connected to the network. The switchboard instructs the allocation of this terminal apparatus 10, to the second base station apparatus 12b. The terminal apparatus 10 performs communications with the second base station apparatus by using a channel allocated by the second base station apparatus 12b.

If, among the base station apparatuses 12 that the radio unit 20 and the baseband processing 22 can communicate with, the wireless communication with a base station apparatus 12 compatible with a wireless communication system having the highest degree of priority does not meet a predetermined quality, the control unit 28 may determine the execution of wireless communications with a base station apparatus 12b compatible with a wireless communication system having a higher degree of priority than this degree of priority. For example, when the second base station apparatus 12b is selected but the wireless quality does not satisfy the predetermined quality, the control unit 28 determines the execution of wireless communications with the first base station apparatus 12a. Here, the quality of wireless communication is represented by the receiving strength, a desired signal power to undesired signal power ratio (DUR) and error rate. The display unit 40 conveys information on the base station apparatus 12 selected by the control unit 28, to the user. Although the control unit 28 selects the base station apparatus 12 here, this is equivalent to selecting a wireless communication system.

Figure 9:
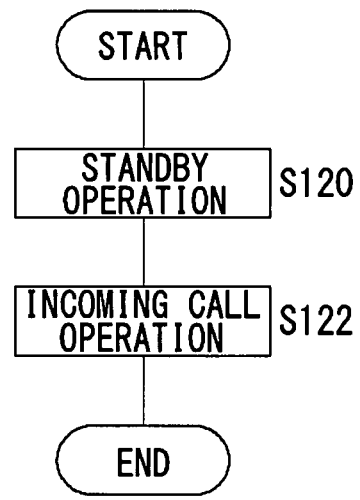
FIG. 9 is a flowchart showing a communication procedure according to another modification of the present invention.

An operation of the terminal apparatus 10 structured as above will now be described. FIG. 9 is a flowchart showing a communication procedure according to another modification of the present invention. After the radio unit 20 has the radio unit 20 and the baseband processing unit 22 perform the standby operation (S120), it has them execute the incoming call/signal receiving operation (S122). Then the processing comes to an end.

Figure 10:
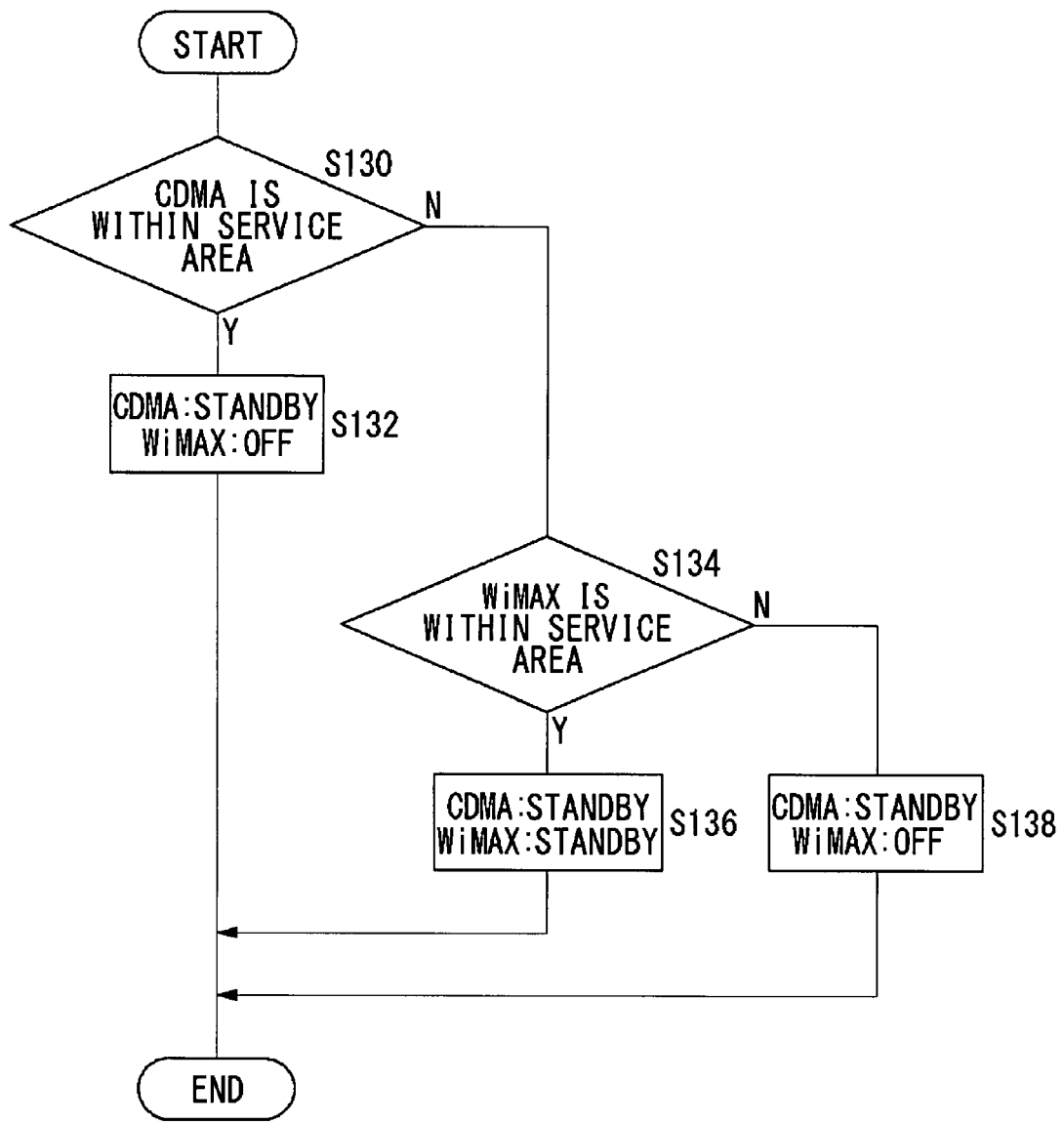
FIG. 10 is a flowchart showing a procedure for processing a standby operation according to still another modification of the present invention.

FIG. 10 is a flowchart showing a procedure for processing a standby operation according to still another modification of the present invention. FIG. 10 corresponds to Step 120 in FIG. 9. If CDMA is found to be within a service area as a result of the inspection by the radio unit 20 and the baseband processing unit 22 (Y of S130), the control unit 28 will determine the execution of the standby operation for CDMA and determine the standby operation for WiMAX to be set to OFF (S132). If CDMA is not within the service area (N of S130) and WiMAX is within a service area (Y of S134) as a result of the inspection by the radio unit 20 and the baseband processing unit 22, the control unit 28 will determine the execution of the standby operation for CDMA and determine the standby operation for WiMAX (S136). If WiMAX is not within the service area (N of S134), the control unit 28 will determine the execution of the standby operation for CDMA and determined the standby operation for WiMAX to be set to OFF (S138). Then the processing is terminated.

Figure 11:
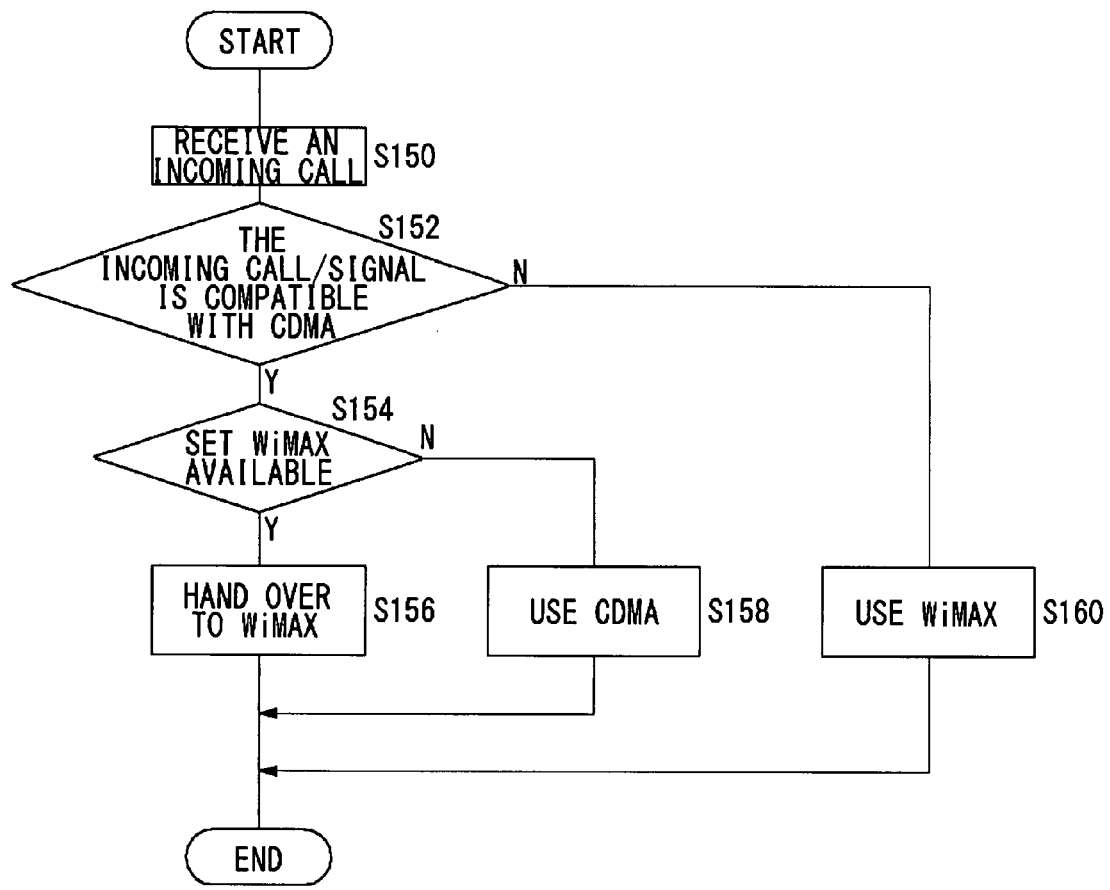
FIG. 11 is a flowchart showing a procedure for processing an incoming call/signal receiving operation according to still another modification of the present invention.

FIG. 11 is a flowchart showing a procedure for processing an incoming call/signal receiving operation according to still another modification of the present invention. FIG. 11 corresponds to Step 122 in FIG. 9. The control unit 28 receives an incoming call or signal via the radio unit 20 and the baseband processing unit 22 (S150). If the incoming call or signal originates from the first base station apparatus 12a compatible with CDMA (Y of S152) and WiMAX is usable (Y of S154), the control unit 28 will determine the handover of the communication system from CDMA to WiMAX (S156). If WiMAX is not usable (N of S154), the control unit 28 decides on the use of CDMA (S158). If, on the other hand, the incoming call or signal does not originate from the first base station apparatus 12a compatible with CDMA (N of S152), the control unit 28 will decide on the use of WiMAX (S160). Then the processing is terminated.

Figure 12:
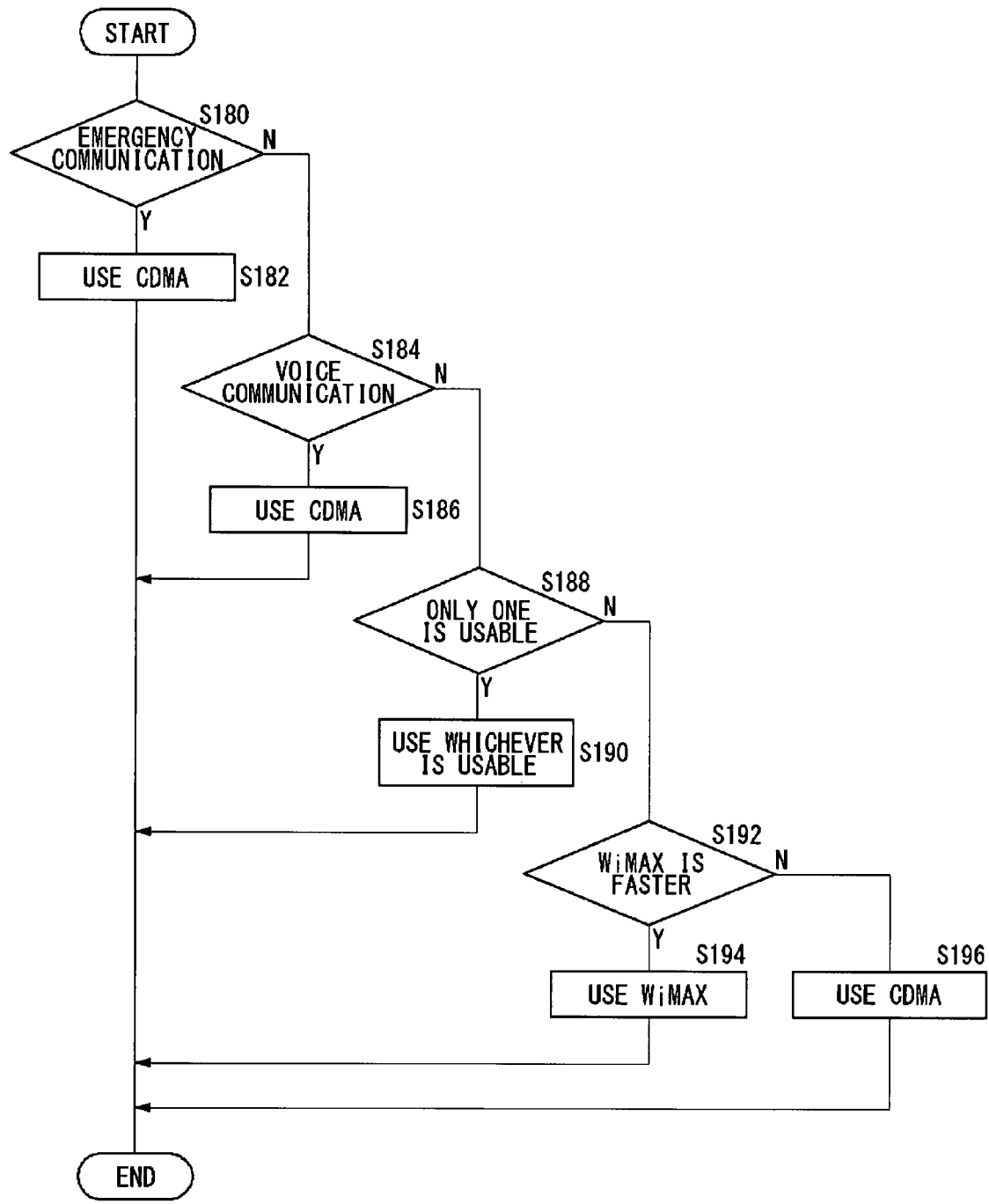
FIG. 12 is a flowchart showing a procedure for processing an outgoing transmission operation according to still another modification of the present invention.

FIG. 12 is a flowchart showing a procedure for processing an outgoing transmission operation according to still another modification of the present invention. If the contents of an outgoing transmission is of emergency nature (Y of S180), the control unit 28 will determine the use of CDMA (S182). Also, if the contents of an outgoing transmission is not of emergency nature (N of S180) but voice communications (Y of S184), the control unit 28 will determine the use of CDMA (S186). If the contents thereof is not voice communications (N of S184) and only one of wireless communication systems is usable (Y of S188), the control unit 28 will determine the use of a wireless communication system whichever is usable (S190). On the other hand, if other than the case where only one of wireless communication systems is usable (N of S188) and WiMAX is faster (Y of S192), the control unit 28 will determine the use of WiMAX (194); and if WiMAX is not faster (N of S192), the control unit 28 will determine the use of CDMA. Then the processing is terminated (S196).

When the use of CDMA has been determined by the control unit 28, the radio unit 20 and the baseband processing unit 22 transmit a channel allocation request to the first base station apparatus 12a and perform wireless communication with the first base station apparatus 12a using the channel allocated by the first base station apparatus 12a. When the use of WiMAX has been determined by the control unit 28, the radio unit 20 and the baseband processing unit 22 transmit a channel allocation request to the second base station apparatus 12b and perform wireless communication with the second base station apparatus 12b using the channel allocated by the second base station apparatus 12b. In order to determine which of CDMA and WiMAX is faster, the terminal apparatus 10 may perform communications with the first base station apparatus 12a and the second base station apparatus 12b, respectively, and may measure the substantial transmission rates in the communications. Alternatively, the terminal apparatus 10 performs communications with the first base station apparatus 12a and the second base station apparatus 12b, respectively, and may acquire the signal strength in the communication so as to estimate the transmission rates from the signal strength.

A description is given hereunder of the display contents on the display unit 40 and the operability of the operation unit 38 which are commonly available in the exemplary embodiments and the modifications. As described above, the display unit 40 displays a wireless communication system which is in use in the terminal apparatus 10. In such a case, the display unit 40 informs the wireless communication system in use by displaying characters, pictorial symbols or the like so that the user can identify the wireless communication system. Here, the wireless communication system in use may be a wireless communication system executing the standby operation or a wireless communication actually performing communications.

Figure 13A:
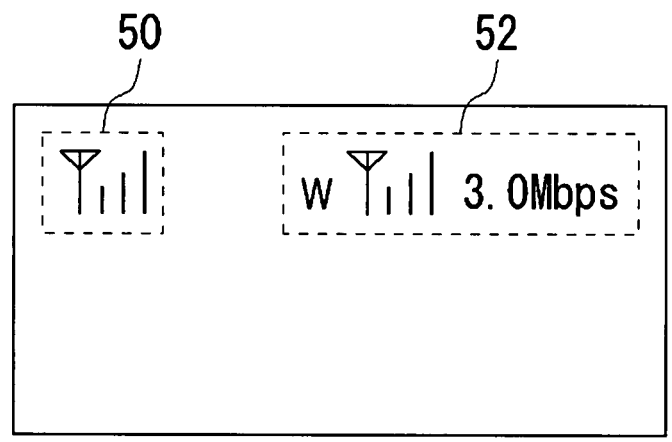
FIGS. 13A and 13B each illustrate what is displayed on a display unit of FIG. 2.
Figure 13B:
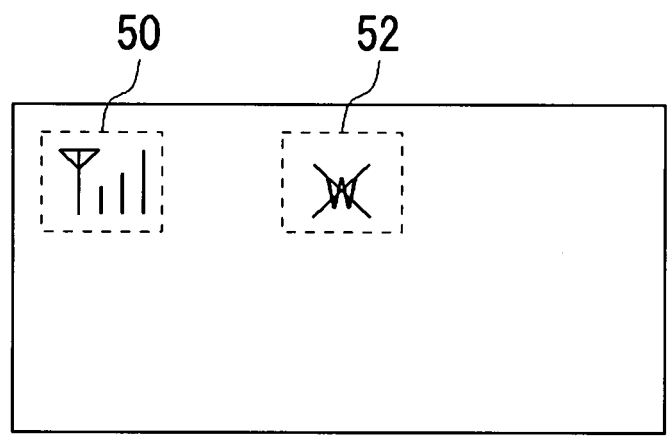

FIGS. 13A and 13B each illustrate contents displayed on the display unit 40. FIG. 13A corresponds to the display contents in a case when standby operations on CDMA and WiMAX are performed. The display unit 40 is provided with a CDMA information display area 50 and a WiMAX information display area 52. Although the display unit 40 additionally displays contents other than these, the explanation thereof is omitted for the clarity of explanation. Information on CDMA is displayed in the CDMA information display area 50. Here, the wireless quality is displayed by the number of antennas. The display showing that the wireless communication is outside the range may be displayed. Information on WiMAX is displayed in the WiMAX information display area 52. Here, WiMAX is identified by the character "W" and the wireless quality is displayed by the number of antennas. The transmission rate, such as "3.0 Mbps", is also displayed. The transmission rate may be displayed using a variety of colors of characters, different blinking intervals or the like.

FIG. 13B corresponds to the display contents in a case when the standby operation for CDMA only is performed. In the CDMA information display area 50, the same contents as those in the case of FIG. 13A are displayed. In the WiMAX information display area 52, X-mark is displayed over the character "W", which indicates that no standby operation for WiMAX is performed.

As described in the exemplary embodiments and the modifications, the display unit 40 executes the display similar to FIGS. 13A and 13B even in a case where the standby operation according to the remaining amount of battery is controlled. For example, as shown in FIG. 13A, when the remaining amount of the battery 42 is large, the wireless communication system which is usable is displayed. When, on the other hand, the remaining amount of the battery 42 is small, a display is made so that the unusable wireless communication system is identifiable as shown in FIG. 13B. Note that the wireless communication system which is not usable may not be displayed at all. When the wireless communication system is switched during communications, the display unit 40 changes the color of LEDs or display so as to inform the user of a change in the wireless communication system. The change in the wireless communication system may be informed via the sound outputted from the speaker 36 or by vibration.

Next, a structure and a function of the operation unit 38 will be described. The operation unit 38 may contain a button with which to automatically switch the wireless communication system. When the button is pressed down, an instruction of switching the system is inputted to the control unit 28. The processing after this depression of button is the same as what is described above and therefore the repeated explanation is omitted here. The control unit 28 may have the display unit 40 display a wireless communication system which is able to perform communications and then may have the user press the button according to the displayed wireless communication system. In so doing, an application by which to measure the throughput is built into the control unit 28. Thus the transmission rate is measured by this application and the measurement result is displayed on the display unit 40. Note that the transmission rate may be displayed in stages such as "fast", "normal" and "slow" but the actual transmission rate such as "3.0 Mbps" may be displayed.

Figure 14:
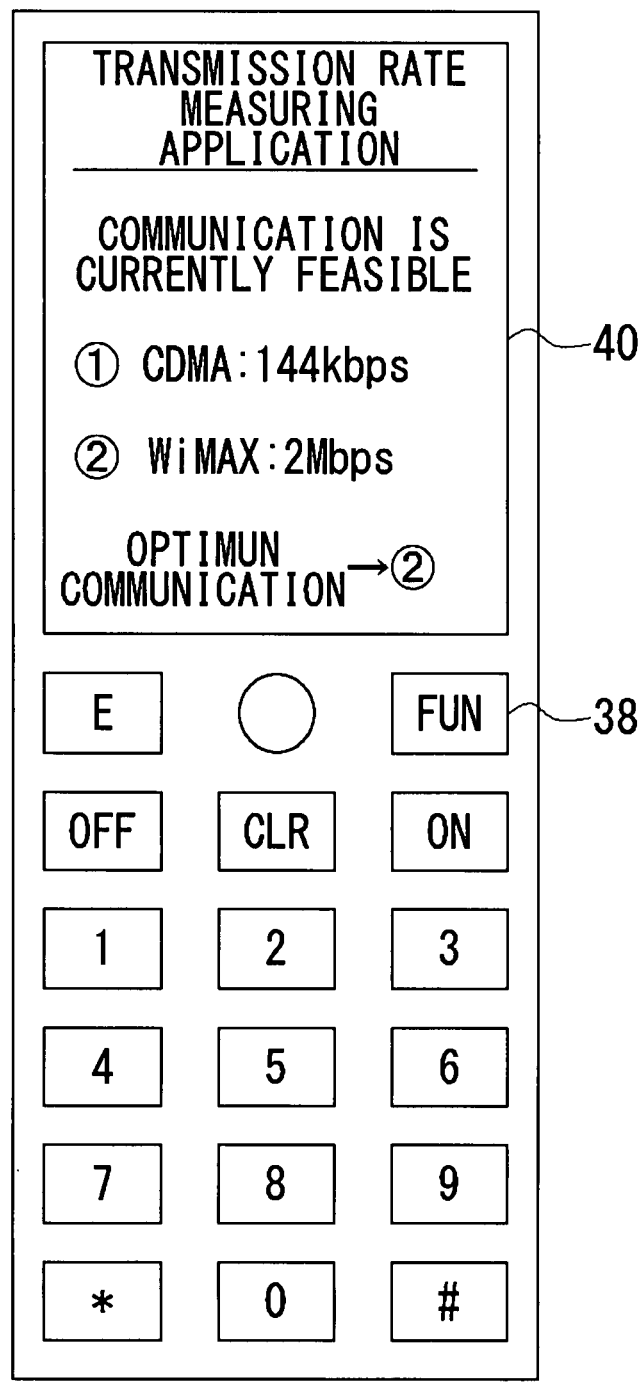
FIG. 14 illustrates a result of executed application designed for measuring a transmission rate in a terminal apparatus of FIG. 2.

FIG. 14 illustrates a result of executed application designed for measuring the transmission rate in a terminal apparatus 10. As shown in FIG. 14, the measurement result of the transmission rate is displayed on the display unit 40. In this case, WiMAX is recommended in the automatic switching. When the button corresponding to "2" is pressed down or after a certain period of time has elapsed while no button is pressed, the control unit 28 determines the use of the recommended wireless communication system. However, in the following cases, the user presses down on the button corresponding to "1" in the operation unit 38, so that the control unit 28 determines the use of CDMA. Such cases include when it is determined by the user that there is a possibility that during a high-speed mobile communication the user moves outside the service area within which WiMAX can be used and when the user wishes to use CDMA in consideration of the communication fees incurred and the like.

According to the exemplary embodiments of the present invention, the time interval of the standby operation for a wireless communication system having a low degree of priority is set longer. Thus, the power consumption can be reduced while the usual and normal standby operation is maintained for a wireless communication system having a high degree of priority. If CDMA is set as a wireless communication system having a high degree of priority, the possibility of receiving an incoming call or signal can be maintained even if the time interval is set longer. The interval is adjusted according to whether the wireless communication is feasible or not, so that any wasteful processing can be eliminated and the processing can be simplified. When the remaining amount of battery is small, whether the communication by WiMAX is feasible or not is no longer checked. Thus, the power consumption can be reduced. The wireless communication system is switched according to the characteristic which is the remaining amount of battery. Thus the standby operation suitable for the characteristic can be realized. Since the remaining amount of battery and/or the degree of priority are taken into consideration, the power consumption according to a plurality of wireless communication systems can be reduced.

Furthermore, whether an instruction is to be received or not is switched according to the remaining amount of battery, so that the processing in accordance with the instruction from the user can be achieved if the remaining amount of battery is large. Since whether an instruction is to be received or not is switched according to the remaining amount of battery, the power consumption can be reduced if the remaining amount of battery is small. Since whether an instruction is to be received or not is switched according to the characteristic which is the remaining amount of battery, the standby operation suitable for the characteristic can be realized. Also, by setting the standby operation in accordance with the remaining amount of battery and user's preference, the user's usability can be improved. Since the number of antennas in use is adjusted, the wireless quality can be enhanced if the remaining amount of battery is large. Since the number of antennas to be used is adjusted according to the remaining amount of battery, the power consumption can be reduced if the remaining amount of battery is small. Also, the state of an on-going operation can be conveyed to the user.

The standby operation is performed on a wireless communication system to which a degree of priority higher than or equal to the highest degree of priority among those of wireless communication systems which can then be communicated is assigned. Thus, as for the wireless communication systems having a high degrees of priority, the usual and normal processing can be executed. Since the standby operation is performed on a wireless communication system to which a degree of priority higher than or equal to the highest degree of priority among those of wireless communication systems which can then be communicated is assigned, any unnecessary processing can be reduced as to a wireless communication system having a low degree of priority. If the degree of priority for CDMA whose service area is wider is raised, the standby operation according to a characteristic, which is the coverage of the service area, can be realized. Since a wireless communication system having an as low as possible degree of priority is used, the congestion of traffic for the wireless communication system having a high degree of priority can be reduced. Also, a wireless communication system having a high degree of priority is preferentially used for the standby operation. Thus, the traffic for the standby operation and the communication after the receipt of an incoming call/signal can be dispersed. Also, even if the communication is feasible but the wireless quality is not satisfactory, the wireless communication system having a high degree of priority is used. Thus, the further deterioration of the wireless quality during the communication can be suppressed.

The present invention has been described based on the exemplary embodiments and modifications. These embodiments and modifications are merely exemplary, and it is understood by those skilled in the art that various other modifications to the combination of each component and each process thereof are still possible and that such modifications are also within the scope of the present invention.

In the exemplary embodiment of the present invention, the radio unit 20 and the baseband processing unit 22 are compatible with two wireless communication systems. And the control unit 28 adjusts the time interval of the standby operation for a wireless communication system having a lower degree of priority, according to the remaining amount of the battery 42. However, this should not be considered as limiting and, for example, the radio unit 20 and the baseband processing unit 22 may be compatible with three or more wireless communication systems. For example, a wireless LAN in compliance with IEEE802.11 is used as the third wireless communication system. In such a case, the degrees of priority are defined respectively for the three or more wireless communication systems, and the control unit 28 performs a control according to the remaining amount of the battery 42 so that the lower the degree of priority is, the time interval of the standby operation will be longer. In the exemplary embodiment, the mode of the standby operation is divided into three different stages according to the remaining amount of the battery 42. It may be divided into more than or less number of stages. By employing this modification, the standby operation according to the remaining amount of battery can be achieved for a terminal apparatus 10 compatible with three or more wireless communication systems. That is, it suffices if the time interval of the standby operation for a wireless communication having a low degree of priority is set longer.

In the exemplary embodiment of the present invention, the radio unit 20 and the baseband processing unit 22 are compatible with two wireless communication systems. And if the communication by a wireless communication system having the higher degree of priority is feasible, the standby operation for the other wireless communication system is stopped. However, the embodiment is not limited thereto and, for example, the radio unit 20 and the baseband processing unit 22 may be compatible with three or more wireless communication systems. In such a case, the control unit 28 specifies a base station apparatus 12 compatible with a wireless communication system having the highest degree of priority among the base station apparatuses 12 that the radio unit 20 and the baseband processing unit can communicate with. The control unit 28 determines the execution of the standby operation for a base station apparatus 12 compatible with a wireless communication system having a degree of priority higher than or equal to the degree of priority given to the specified base station apparatus 12. And the control unit 28 determines the stopping of the standby operation for a base station apparatus 12 having a degree of priority less than the degree of priority given to the specified base station apparatus 12. According to this modification, the standby operation performed in consideration of the coverage of the service area can be achieved.

The control unit 28 performs an outgoing transmission by WiMAX. However, if the terminal apparatus 10 of a communicating party can only accept an incoming call/signal by CDMA because the battery 42 of the terminal apparatus 10 of the communicating party is low, the control unit 28 may switch to CDMA. In such a case, the control unit 28 receives, via the radio unit 20 and the baseband processing unit 22, the signal indicating that the call/signal coming from the terminal apparatus 10 of the communicating party can only be accepted by using CDMA. The display unit 40 may display accordingly. By employing this modification, the user's usability is enhanced.

What is claimed is:

1. A terminal apparatus, comprising:
a communication unit which performs wireless communications compatible with a plurality of wireless communication schemes, respectively;
an inspection unit which inspects a remaining amount of battery to be supplied to said communication unit; and
a control unit which controls a standby operation that said communication unit is to perform on the plurality of wireless communication schemes, based on the remaining amount of battery inspected by said inspection unit,
wherein said communication unit performs standby operations in the plurality of wireless communication schemes in parallel,
said control unit defines degrees of priority for the plurality of wireless communication schemes, respectively,
said control unit causes said communication unit to inspect whether, in a first state where the remaining amount of battery is large, a wireless communication is feasible or not in the wireless communication scheme having a low degree of priority, and when the wireless communication is not feasible, said control unit sets long the time interval of the standby operation in the wireless communication scheme having a low degree of priority,
said control unit causes said communication unit to inspect whether, in a second state where the remaining amount of battery is smaller than the first state, the wireless communication is feasible or not in the wireless communication scheme having a low degree of priority, and when the wireless communication is not feasible, said control unit stops the standby operation in the wireless communication scheme having a low degree of priority, and
in a third state where the remaining amount of battery is smaller than the second state, said control unit stops the standby operation in the wireless communication scheme having a low degree of priority, regardless of whether the wireless communication is feasible or not in the wireless communication scheme having a low degree of priority, and a time interval in the standby operation in the wireless communication scheme having a high degree of priority is adjusted according to whether the wireless communication is feasible or not in the wireless communication scheme having a high degree of priority.

2. A terminal apparatus according to claim 1, said communication unit being provided with a plurality of antennas,
wherein as the remaining amount of battery becomes low, said control unit reduces the number of antennas to be used for the standby operation, among the plurality of antennas provided in said communication unit.

3. A terminal apparatus according to claim 1, further comprising a notification unit which conveys contents of the standby operation controlled by said control unit to a user.

4. A communication method for a terminal apparatus, comprising:
performing wireless communications compatible with a plurality of wireless communication schemes by the terminal apparatus, respectively;
inspecting a remaining amount of battery to be supplied to the terminal apparatus;
controlling a standby operation that the terminal apparatus performs on the plurality of wireless communication schemes, based on the remaining amount of battery, wherein
the performing performs standby operations in the plurality of wireless communication schemes in parallel, and
the controlling defines degrees of priority for the plurality of wireless communication schemes, respectively;
inspecting whether, in a first state where the remaining amount of battery is large, a wireless communication is feasible or not in the wireless communication scheme having a low degree of priority, and, when the wireless communication is not feasible, setting long the time interval of the standby operation in the wireless communication scheme having a low degree of priority;

inspecting whether, in a second state where the remaining amount of battery is smaller than the first state, the wireless communication is feasible or not in the wireless communication scheme having a low degree of priority, and, when the wireless communication is not feasible, stopping the standby operation in the wireless communication scheme having a low degree of priority; and in a third state where the remaining amount of battery is smaller than the second state, stopping the standby operation in the wireless communication scheme having a low degree of priority, regardless of whether the wireless communication is feasible or not in the wireless communication scheme having a low degree of priority, and adjusting a time interval in the standby operation in the wireless communication scheme having a high degree of priority according to whether the wireless communication is feasible or not in the wireless communication scheme having a high degree of priority.

* * * * *